US008870494B2

(12) United States Patent
Andres et al.

(10) Patent No.: US 8,870,494 B2
(45) Date of Patent: Oct. 28, 2014

(54) AUTONOMOUS UNDERWATER ARRAY BURIAL SYSTEM

(75) Inventors: Jose M. Andres, Waimanalo, HI (US); Dale Norman Jensen, Kailua, HI (US)

(73) Assignee: Makai Ocean Engineering, Inc, Kailua, HI (US)

( * ) Notice: Subject to any disclaimer, the term of this patent is extended or adjusted under 35 U.S.C. 154(b) by 241 days.

(21) Appl. No.: 13/590,418

(22) Filed: Aug. 21, 2012

(65) Prior Publication Data
US 2013/0051919 A1    Feb. 28, 2013

Related U.S. Application Data

(60) Provisional application No. 61/527,558, filed on Aug. 25, 2011.

(51) Int. Cl.
*F16L 1/16*    (2006.01)
*H02G 1/10*    (2006.01)

(52) U.S. Cl.
CPC ..................................... *H02G 1/10* (2013.01)
USPC ........................................................ 405/159

(58) Field of Classification Search
USPC .......... 405/159–165, 174, 180, 181, 183–184
See application file for complete search history.

(56) References Cited

U.S. PATENT DOCUMENTS

| 3,338,060 | A | * | 8/1967 | Harmstorf | 405/163 |
| 3,462,963 | A | * | 8/1969 | Moore | 405/164 |
| 4,877,355 | A | * | 10/1989 | Van Pelt | 405/159 |
| 6,719,494 | B1 | * | 4/2004 | Machin | 405/163 |
| 8,360,685 | B1 | * | 1/2013 | Whiteside et al. | 405/160 |

* cited by examiner

*Primary Examiner* — Sunil Singh
(74) *Attorney, Agent, or Firm* — The Marbury Law Group, PLLC

(57) ABSTRACT

An underwater cable burial mechanism including a nozzle disposed in front of a plow blade wherein the nozzle is configured to spray a jet of water onto the sea floor in an intended path of the plow blade to bury a cable in the sea floor. In an embodiment, the underwater cable burial mechanism may include two or more straight flow nozzles disposed in front of the plow blade at various angles and heights. In an embodiment, the underwater cable burial mechanism may be a component of an array burial vehicle, the array burial vehicle further including a pump to provide water to the nozzle(s), cable pack to hold a cable array, at least one ski configured to ride along the sea floor, and at least one thruster configured to propel the array burial vehicle along the sea floor.

27 Claims, 19 Drawing Sheets

AUTONOMOUS UNDERWATER ARRAY BURIAL SYSTEM

CROSS REFERENCE TO RELATED APPLICATIONS

This application claims the benefit of priority to U.S. Provisional Patent Application Ser. No. 61/527,558 entitled "Autonomous Underwater Array Burial System" and filed Aug. 25, 2011, which is incorporated herein by reference in its entirety.

BACKGROUND

Burial of cables may be an efficient way of protecting submarine cables in areas where the cables may be damaged by trawling, ship anchors, and other bottom threats. A new generation of arrays are being developed for applications, including environmental monitoring, scientific observations of the ocean in littoral areas, sub-bottom mapping for hydrocarbon searches and well depletion monitoring, and surveillance applications. These arrays may typically be 100 m to 1000 m long, less than ¾ inch in diameter and may include multiple in-line sensors along their length. Typically it may be desirable to bury these arrays several inches below the sea floor to increase their survivability, often 4 inches to 8 inches below the sea floor. Often, these arrays may be deployed in water from 30 m to 500 m deep with up to 15 degree bottom slopes and in soils with support capabilities as low as 0.5 psi. These arrays may be able to withstand ocean bottom currents of one knot and go over seabed obstacles as high as three feet.

Submarine telecommunications cables, power cables and many of the U.S. Navy's cables and arrays are commonly buried in waters up to 1,500 meters deep, and even deeper in some areas of the world. In current systems, one of two main burial methods may be used. A first type of system uses a plow to simultaneous lay and bury the cable. The second type of system uses a Remotely Operated Vehicle ("ROV") with a jetting system to bury the cable after it has been laid (i.e., post-lay burial operation).

Plowing is the dominant burial technique used for submarine cables. Current plows are large structures weighing 10 to 20 tons and requiring typical pulling tensions of 40 to 60 tons in order to bury cables 1.0 to 1.5 m (and deeper in soft soils) below the seabed. The main advantages of using a towed plow simultaneously with the cable lay are good work rate, instantaneous and effective protection, and high reliability. A plow is not generally appropriate for post-lay operations due to the intrinsic limitations of low maneuverability and the need for loading and unloading the cable on the seabed. Also, since a plow depends on ground reaction forces for stability, steep surfaces and/or soft, unstable bottoms can induce the plow to tip over and/or run away. Since the cable is threaded through the structure of the plow, instability in these situations may lead to danger to both cable and plow. Experience to date shows that plows tends to be more efficient in soils with a slope of 5 degrees or less.

ROVs are mostly used to bury cables during post-lay inspection operations. In contrast to a plow, an ROV equipped with a jetting tool for cable burial is able to swim along and above the cable route and can work in areas with steeper slopes. While the ROV has better maneuverability than the plow, with a jetting ROV it is difficult to reliably bury the cable to the specified depth. Since the ROV is hovering above the cable it is difficult to maintain a fixed distance between the jetting tool and the cable. Consequently, the work rate of an ROV tends to be slower than that of the plow since there is often the need to have the ROV perform multiple passes over the cable to achieve the desired burial depth. Additionally, the presence of strong bottom currents can impose limitations in the use of an ROV in deep water.

While existing ROV and plow technologies commonly used to bury submarine cables are well tested, there are key and critical differences between the burial of conventional submarine cables and the arrays addressed herein. First, conventional plows and jetting ROVs are connected to a surface vessel which supplies all the power needed by the plow and/or ROV. Because of this relatively unlimited power supply, plows and jetting ROVs are not designed for optimum burial efficiency per unit of power used. Rather, plows and jetting ROVs are mainly designed to achieve maximum and reliable burial depth and fast rates of burial. Typical pulling tensions on the plows are 40 to 60 tons and power requirements for jetting ROVs are several hundred kilowatts. This represents two to three orders of magnitude more power than could be practically used by an ABV to bury the new generation of arrays that may be buried between 4 and 8 inches below the seabed.

There is a need for an ABV that is a totally autonomous, low cost vehicle, which must reliably bury a cable up to 1.0 km long. Since final cost of the system may be a key driving factor, the ABV must bury the cable and navigate the entire route using the least amount of energy possible. The smaller the energy footprint, the smaller and more economical the vehicle will be. Simply scaling down a conventional cable burial system will not provide a viable solution, and a new design needs to be developed that meets the specific requirements. Overall, the existing technology for cable burial does not provide design experience or performance data applicable to the development of the needed ABV.

SUMMARY

The systems, methods, and devices of the various embodiments provide an underwater cable burial mechanism including a nozzle disposed in front of a plow blade wherein the nozzle is configured to spray a jet of water into the sea floor in an intended path of the plow blade to bury a cable in the sea floor. In an embodiment, the underwater cable burial mechanism may include two or more nozzles disposed in front of the plow blade at various angles and heights. In the various embodiments, the nozzles may be straight flow nozzles. In an embodiment, the underwater cable burial mechanism may be a component of an array burial vehicle, the array burial vehicle further including a pump to provide water to the nozzle(s), cable pack to hold a cable array, at least one ski configured to ride along the sea floor, and at least one thruster configured to propel the array burial vehicle along the sea floor.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
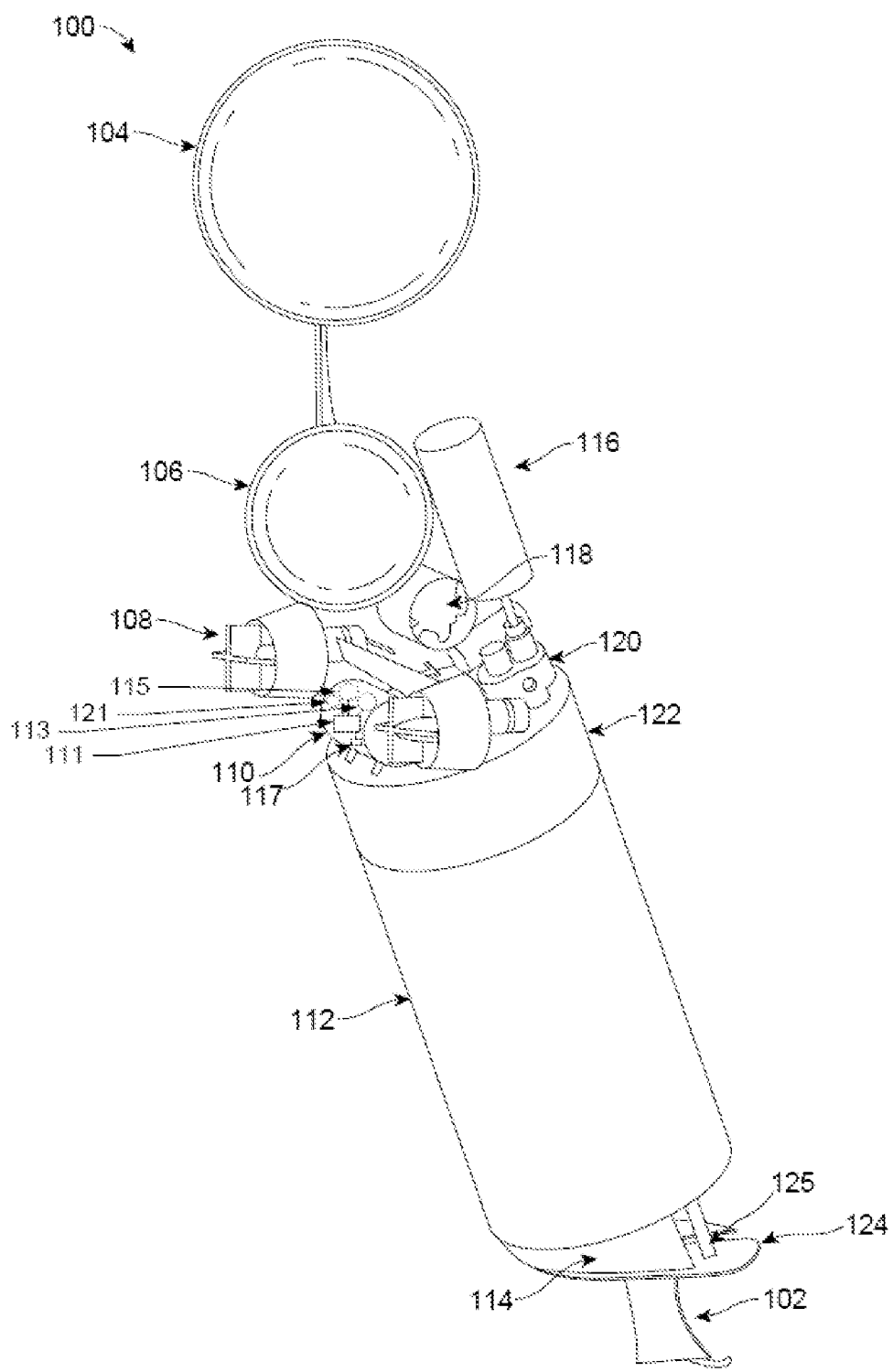
FIG. 1 is component block diagram of an array burial vehicle configured for burial operations according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "sea floor" as used herein refers to the floor (i.e., bottom, bed, seabed, soil, sediment, etc.) of any and all salt water and/or fresh water bodies, such as oceans (i.e., seas), lakes, rivers, bays, inlets, ponds, streams, etc.

The various embodiments provide a sea floor cable burial system that combines a cable burial device with a jetting device to bury a cable array in a sea floor trench. In the various embodiments, a liquid jet sprayed into an intended trench path may liquidize the sea floor sediment, and a plow passing through the liquidized sea floor sediment may deposit a cable in the trench. In an embodiment, an array burial vehicle ("ABV") may include a flying autonomous underwater vehicle ("AUV"), a bottom traversing crawler, and one or more jets together with a cable insertion device to guide a cable array into a trench in the seafloor.

The requirements for ABVs to bury the new generation of cable arrays, including the requirements that the ABV be low cost, autonomous, and of small size, make any attempts at using current plow systems and current jetting systems, separately or together, unsuitable for use burying the new generation of cable arrays. Current plow and/or jetting systems are incapable of meeting the needs because current plow and/or jetting systems are too large and cannot operate independently.

In an embodiment, a water jet cable burial system configured for shallow burial of arrays is provided. The developed system may be a one-time use system used in an array burial vehicle. Components of the jet burial system may include a hollow plow blade through which the instrumented cable is deployed to the bottom of the jetted trench. In an embodiment, the length of the blade may be only long enough to allow for the cable to bend 90 degrees between the cable entrance and exit point. The jet burial system may also include two straight flow (i.e., non-conic discharge shape), nozzles separated horizontally and vertically and angled toward the plow blade. In the various embodiments, the location and orientation of the nozzles may be configured to generate a current that directs the sediment below and around the back of the plow blade, helping the plow blade to move through the trench with little resistance. The nozzle angle may be configured to generate a hydraulic jump as the current slows down towards the back of the plow blade rapidly reducing the water velocity and allowing the sediment in suspension to settle back down backfilling most of the incised trench. In addition, the turbulence and high velocities may induce breaching of the trench walls. In an embodiment, the combination of breaching and over-spilling of suspended sediment may leave the trench filled to about 75% to 80% of the original depth.

In an embodiment, an ABV may slide along the seafloor on Teflon® coated skid(s) and may be driven by electric thrusters. In an embodiment, water may flow at 14.5 gpm to each nozzle with a delivery pressure of 60 psi. In an embodiment, the total energy consumption required to perform the cable burial operation may be significantly lower than for commercially available cable jetting or cable plow systems. In an embodiment, a 1 kilometer long cable array may be buried to a depth of 8 inches at an average velocity of 0.4 knots with the consumption of 3.3 kW/hr of energy. In another embodiment, the energy required to bury a 4 inch cable may be reduced to 1.65 kW/hr. In an embodiment, by adjusting the height of the nozzles, burial depths of 4 inches, 6 inches and 8 inches may be consistently obtained. In an embodiment, keeping the angle of the front face of the blade almost vertical may minimize vertical reaction forces on the plow and may help keep the burial depth constant.

In an embodiment, the water jet cable burial system may be configured to bury cables to a depth of 12 inches or more. In an embodiment, burying cable to a depth of 12 inches or more may require an increase in the size and flow of each nozzle and/or the addition of a third nozzle with a flow of 15 gpm. In an embodiment, the energy required to bury the cable may be approximately linear with burial depth. In an embodiment, burying large pressure vessels associated with surveillance systems (e.g., batteries, communication packages, etc.) may be efficiently achieved using the same burial equipment.

FIG. 1 illustrates an embodiment ABV 100 configured for burial operations. The ABV 100 may be considered a "hybrid" ABV because the ABV 100 may be a combination of a flying AUV and a bottom traversing crawler. The ABV 100 may use a jetting system together with a cable insertion device, such as plow 102, to guide a cable array 302 (illustrated in FIG. 3) into the bottom of a trench in the sea floor. The depth of the trench in the sea floor may be any depth, such as a less than 4 inch deep trench, an approximately 4 inch deep trench, a 4 to 6 inch deep trench, a 6 to 8 inch deep trench, a less than 8 inch deep trench, and/or an 8 inch or greater deep trench.

In an embodiment, the ABV 100 may include a pump 120 connected to the jetting system, and configured to provide water to the jetting system. The pump 120 may be connected to an electric pump motor 116 which may be connected to a battery 122 and a processor 111 within an electronics pressure housing 110. In an embodiment, based on the size and weight of the ABV 100, the ocean currents, forward speed, and soil excavation rates, the total energy requirements for ABV 100 over a cable burial route may be in the range of 5.0 to 8.0 kWh, with more than 50% of this energy required by the jetting system. In an embodiment, the energy for the ABV 100 may be provided by the battery 122 which may be a one-time use (i.e., primary) high-energy-density battery (e.g., Li-polymer) or a multiple use (secondary) high-energy-density battery. In an embodiment, the size of the battery may be a cylinder and the battery 122 may have a submerged weight of less than 20 lbs. The processor 111 may be configured with processor executable instructions to perform operations to control the operation of the electric pump motor 116 and pump 120 to control the flow rate of water to the jetting system and to control the net weight of the ABV 100 by actively controlling the buoyancy of the ABV 100. In an embodiment, the pump 120 may be controlled such that water jets provided from the nozzles of the jetting system all have the same hydraulic pressure. The ABV 100 may also include one or more electric thrusters, such as an articulated thruster 108 and a side thruster 118. In an embodiment, the articulated thruster 108 and the side thruster 118 may be connected to the battery 122 and the processor 111, and the processor 111 may be configured with processor executable instructions to perform operations to control the operation of the articulated thruster 108 and side thruster 118. The orientation of the articulated thruster 108 may be controlled by a motor and gearbox assembly 202 (illustrated in FIG. 2) which may be connected to the articulated thruster 108. The motor and gearbox assembly 202 may also be connected to the battery 122 and the processor 111, and the processor 111 may be configured with processor executable instructions to control the orientation of the articulated thruster 108 via the motor and gearbox assembly 202. In an embodiment, the articulated thruster 108 may be two variable power thrusters, e.g., a port and starboard variable power thrusters. The ABV 100 may also include a high pressure air tank 106 connected to an inflatable ballast 104. The high pressure air tank 106 may provide air to the inflatable ballast 104, and the inflatable ballast 104 may be configured to provide buoyancy for the ABV 100 when inflated with air from the high pressure air tank 106. The processor 111 may be configured with processor executable instructions to control the inflatable ballast 104 in order to maintain the appropriate reaction force on the soil and prevent the ABV 100 from sinking on soft soils and to compensate for the weight loss as the cable array 302 (illustrated in FIG. 3) is buried. The ABV 100 may also include a cable pack 112 configured to hold a cable array 302 (illustrated in FIG. 3) for burial by the ABV 100 and at least one ski 124 or skid configured to ride along the sea floor. In an embodiment, the ski 124 may be hinged to the ABV 100 via a flexible cloth 114. The ABV 100 may also include one or more load sensors 125, such as transducer and/or strain gauge, which may be connected to the processor 111 and configured to measure the reaction force on the seafloor.

In an embodiment, the electronics pressure housing 110 may include a heading sensor 113, depth sensor 115, pitch sensor 121, and input/output connection 117 connected to the processor. In an embodiment, the input/output connection 117 may be a cable port, such as USB port, or a wireless transceiver, such as a Bluetooth® transceiver, configured to enable the processor 111 to receive data inputs from a device external to the ABV 100. In this manner, prior to launch of the ABV 100 data may be provided to the ABV 100 via the input/output connection 117, and during operation the processor 111 may control the operation of the ABV 100 using the provided data. As an example, data inputs to the processor 111 provided via the input/output connection 117 may include an array orientation input, for example the desired orientation on the sea floor of the cable array 302 (illustrated in FIG. 3) laid by the ABV 100, a burial depth input, for example the desired depth below the surface of the sea floor that the cable array 302 (illustrated in FIG. 3) laid by the ABV 100 should be buried, a buoyancy required to maintain the desired reaction force on the seabed to prevent sinking on the seafloor and minimize the propulsion force required, and/or a sea floor reaction force indication, for example the desired reaction force the ABV 100 should exert on the bottom during cable burial operations. In an embodiment, the heading sensor 113 may be an electronic compass, such as a fluxgate compass. In an embodiment, the processor 111 may use heading data received from the heading sensor 113 to control the operation of the ABV 100. As an example, the processor 111 may use heading data from the heading sensor 113 to control the operation of the side thruster 118, articulated thruster 108, and/or motor and gear box 202 to orient and propel the ABV 100 in a direction corresponding to a heading of an input array orientation. In an embodiment, the processor 111 may use pitch angle data received from the pitch sensor 121 to control the operation of the articulated thruster 108, motor and gear box 202, high pressure air tank 106, and/or inflatable ballast 104 to control the pitch of the ABV 100. In an embodiment, the load cells 125 may be used to measure the reaction force on the seafloor and the processor 111 may use the data received from the load cells 125 to control the pump 120, pump motor 116, high pressure air tank 106, and/or inflatable ballast 104 to maintain the buoyancy at a buoyancy input as the cable array 302 (illustrated in FIG. 3) is deployed and to adjust for different types of soils with different support capabilities. In an embodiment, the processor 111 may use reaction force data received from the one or more load cells 125 to control the operation of the inflatable ballast 104 to maintain a reaction force corresponding to a seafloor reaction force input. In an embodiment, the depth sensor 115 may be any type depth sensor, such as a pressure sensor configured to determine a depth based on the water pressure. In an embodiment, the processor 111 may use depth data received to control the operation of the ABV 100. As an example, the processor 111 may use depth data from the depth sensor 115 to control the operation of the pump 120, pump motor 116, high pressure air tank 106, and/or inflatable ballast 104 to bury the cable array 302 (illustrated in FIG. 3) at a depth corresponding to a burial depth input, such as by controlling the pump 120, pump motor 116, high pressure air tank 106, and/or inflatable ballast 104 to control the output of the jetting system and/or trench depth of the plow 102.

Figure 2:
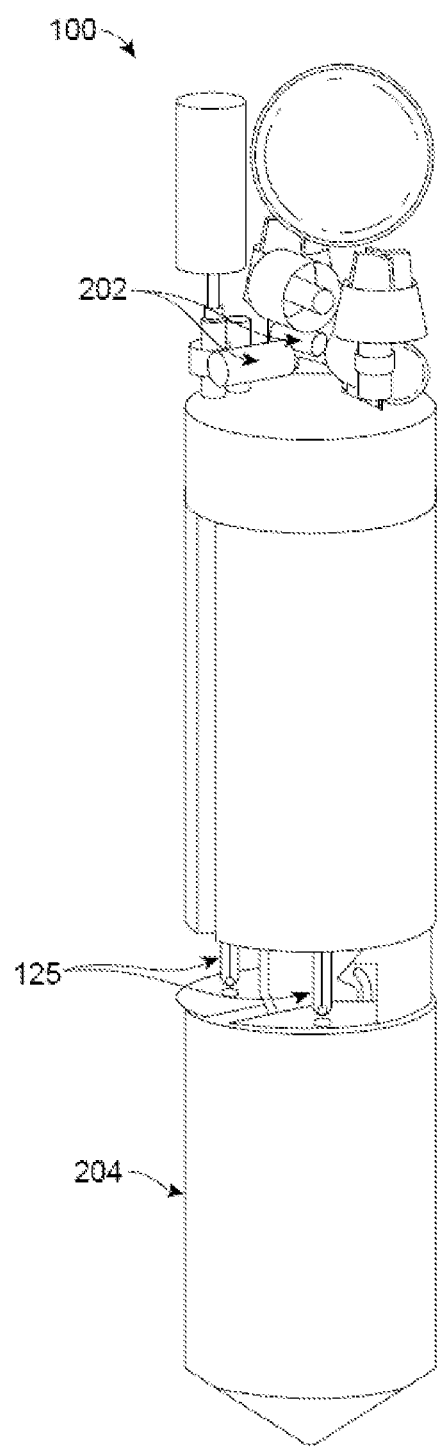
FIG. 2 is a component block diagram of the array burial vehicle illustrated in FIG. 1 in a pre-deployment configuration.

FIG. 2 illustrates the ABV 100 in a pre-launch configuration. In an embodiment, prior to launch the ABV 100 may include a communications package 204 which may be disposed below the cable pack 112. In an embodiment, the communications package 204 may include the various communications equipment, such as transceivers, memories, and processors, necessary for communicating acoustic data gathered by the cable array 302 (illustrated in FIG. 3) to other devices.

Figure 3:
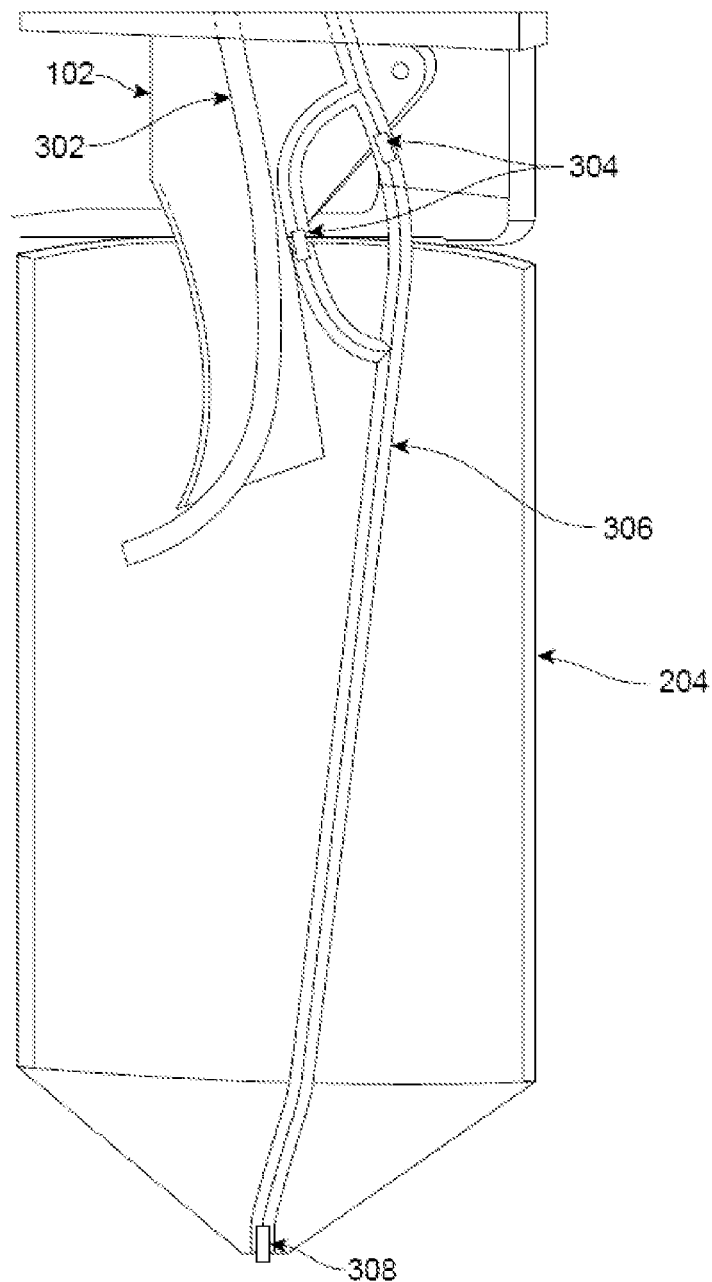
FIG. 3 is a cutaway side-view of a lower portion of the array burial vehicle illustrated in FIG. 1 in a pre-deployment configuration.

FIG. 3 illustrates a cross sectional view of the communications package 204, plow 102, and jetting system portions of the ABV 100 in the pre-launch configuration. In an embodiment, the communications package 204 may be coupled to one end of the cable array 302 stored in the cable pack 112 and the cable array 302 may pass through the plow 102 to from the communications package 204 to the cable pack 112. In this manner, in the deployed configuration, as the ABV 100 moves, the cable array 302 may payout through the plow 102. In an embodiment, the communications package 204 may be removeably connected to the ABV 100, such that after deployment the communications package 204 may be buried in the sea floor and detached from the ABV 100. In an embodiment, a hose 306 may connect to the nozzle(s) of the jetting system via disconnects 304. The hose 306 may provide water from the nozzle(s) of the jetting system to a nozzle 308 at an end of the communications pack 204 to bury the communications pack 204 in the sea floor as discussed below.

In an embodiment, the ABV 100 may be launched from a surface or subsurface platform, such as a ship, ROV, or UUV. In an embodiment, prior to launch, array parameters, such as an array orientation, burial depth, etc. may be input into the ABV 100 via the input/output connection 117. In operation, once the ABV 100 is launched it may sink to the bottom of the water, and the falling velocity may be controlled by the inflatable ballast 104 and/or articulated thruster 108 generating a force upward to slow the descent to velocities smaller than 3 knots. Once on the seabed the pump 120 and jetting system may be activated for a period of time, such as approximately 15 minutes, to pump water through the hose 306 and out of the nozzle 308 to displace sand on the sea floor, until the entire communication package 204 may be buried. In an embodiment, once the communication package 204 is buried, the articulated thruster 108 and/or inflatable ballast 104 may be operated to pull the ABV 100 may away from the communication package 204, causing the communication package 204 and disconnects 304 to disconnect from the ABV 100 and nozzle(s) of the jetting system. In an embodiment, the disconnects 304 may be plastic hose connections configured to disconnect from the nozzle(s) when 30 to 50 lbs of pulling force is applied.

In an embodiment, with the communication package 204 disconnected and buried, the ABV 100 may be in the deployed configuration, and the ABV 100 may start moving along the sea floor at ⅓ to ½ knot propelled by the articulated thruster 108. In an embodiment, the trenching jet(s) output by the nozzle(s) of the jetting system (which may already be spraying water from being activated to bury the communications package 204) may start liquefying the seabed and cause the plow 102 to sink and push the cable array 302 to the prescribed depth, such as 4 to 8 inches. In an embodiment, the aft section of the ABV 100 may be heavier than the forward section to induce a nose up attitude, for example greater than 60 degrees, which may facilitate riding over bottom obstacles.

In an embodiment, propulsion for the ABV 100 may provided by the articulated thruster 108 while the processor 111 may be configured with processor-executable instructions to perform operations as a navigational control system receiving feedback from the heading sensor 113 and pitch sensor 121 on the ABV 100 in order to maintain course and keep constant pitch. In an embodiment, if an obstacle is encountered, the processor 111 may increase thrust and/or pitch angle to pull the ABV 100 over the obstacle. In an embodiment, the net wet weight of the ABV 100 may be kept low, for example, at 40 to 60 lbs, and the propulsion power generated by the articulated thruster 108 may be large enough to lift the entire vehicle over obstacles. In an embodiment, as the cable array 302 is deployed, the inflatable ballast 104 may be partially vented to compensate for the weight lost by the deployment of the cable array 302. In an embodiment, when the processor 111 determines that a specific percentage of the cable array 302 has been paid out of the cable pack 112, the processor 111 may control the operation of the articulated thruster 108 and/or side thruster 118 to change the heading of the ABV 100 to follow a pre-programmed route. In an embodiment, when the cable array 302 is totally deployed, the ABV 100 may keep moving and pull away from the now buried cable array 302 and/or the inflatable ballast 104 may be inflated to cause the ABV 100 to float to the surface for recovery.

Figure 4:
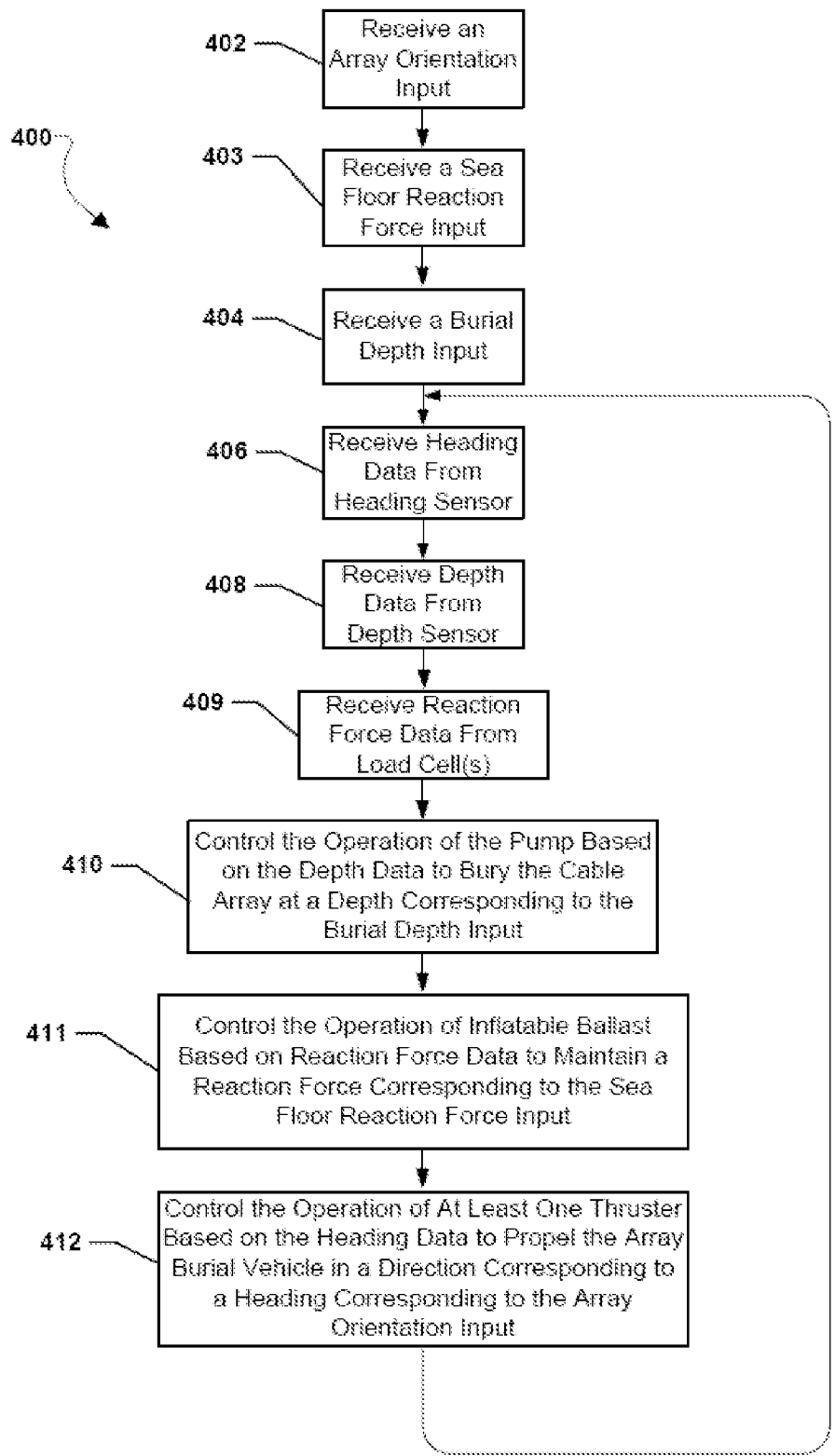
FIG. 4 is a process flow diagram illustrating an embodiment method for controlling burial depth, array orientation, and ballast operation.

FIG. 4 illustrates an embodiment method 400 for controlling the burial depth and array orientation of a cable array buried by an ABV and the reaction force of an ABV on the seafloor. In an embodiment, the operations of method 400 may be performed by the processor of an ABV, such as the processor 111 of ABV 100 described above with reference to FIGS. 1-3. At block 402 the ABV processor may receive an array orientation input. In an embodiment, the array orientation input may be one or more heading indications defining an intended orientation of a cable array received via an input/output connection prior to launch of the ABV. At block 403 the ABV processor may receive a seafloor reaction force input. In an embodiment, the seafloor reaction force input may be one or more pressure indications defining an intended pressure (i.e., force) the ABV is to exert on the seafloor received via an input/output connection prior to launch of the ABV. As an example, the seafloor reaction force input may be about 0.8 psi or 50 lbs. In an alternative embodiment, rather than a sea floor reaction force input, a bottom type input, such as "sand," may be received via the input/output connection and the processor of the ABV may determine the seafloor reaction force by comparing the bottom type input to a data table in a memory of the ABV correlating bottom types and reaction forces. At block 404 the ABV processor may receive a burial depth input. In an embodiment, the burial depth input may be an indication of the intended distance below the sea floor the ABV should bury the cable array received via the input/output connection prior to launch of the ABV. As an example, the burial depth input may be an indication corresponding to 4 inches. At block 406 the ABV processor may receive heading data from the heading sensor of the ABV. As an example, the ABV processor may receive a compass heading as heading data from the ABV. At block 408 the ABV processor may receive depth data from the depth sensor. As an example, depth data may indicate the depth below the water at which the ABV may currently be operating. At block 409 the ABV processor may receive reaction force data from one or more load cells. As an example, reaction force data may indicate the reaction force of a skid of the ABV against the seafloor. At block 410 the ABV processor may control the operation of the ABV pump based on the depth data to bury the cable array at a depth corresponding to the burial depth input. In an embodiment, the ABV processor may control the operation of the pump by activating the pump when the depth data corresponds to the bottom depth of the sea floor to spray a jet of water onto the sea floor in a path of the ABV plow. At block 411 the ABV processor may control the operation of the inflatable ballast based on the reaction force data to maintain a reaction force corresponding to the seafloor reaction force input. In an embodiment, the ABV processor may inflate or vent the inflatable ballast in order to maintain the desired reaction force on the seafloor, thereby preventing the ABV from sinking into the seafloor and/or minimizing the propulsion energy necessary to move the ABV along the seafloor. At block 412 the ABV processor may control the operation of at least one of the ABV thrusters based on heading data to propel the ABV in a direction corresponding to a heading corresponding to the array orientation input. In an embodiment, the ABV processor may activate a thruster to align the ABV heading with a heading of the array orientation input and the thruster may also propel the ABV along the sea floor in the direction of that heading. The method 400 may then return to block 406 to receive new heading data. In this manner, the ABV processor may continually control the operation of the ABV to align and bury the cable array.

Figure 5:
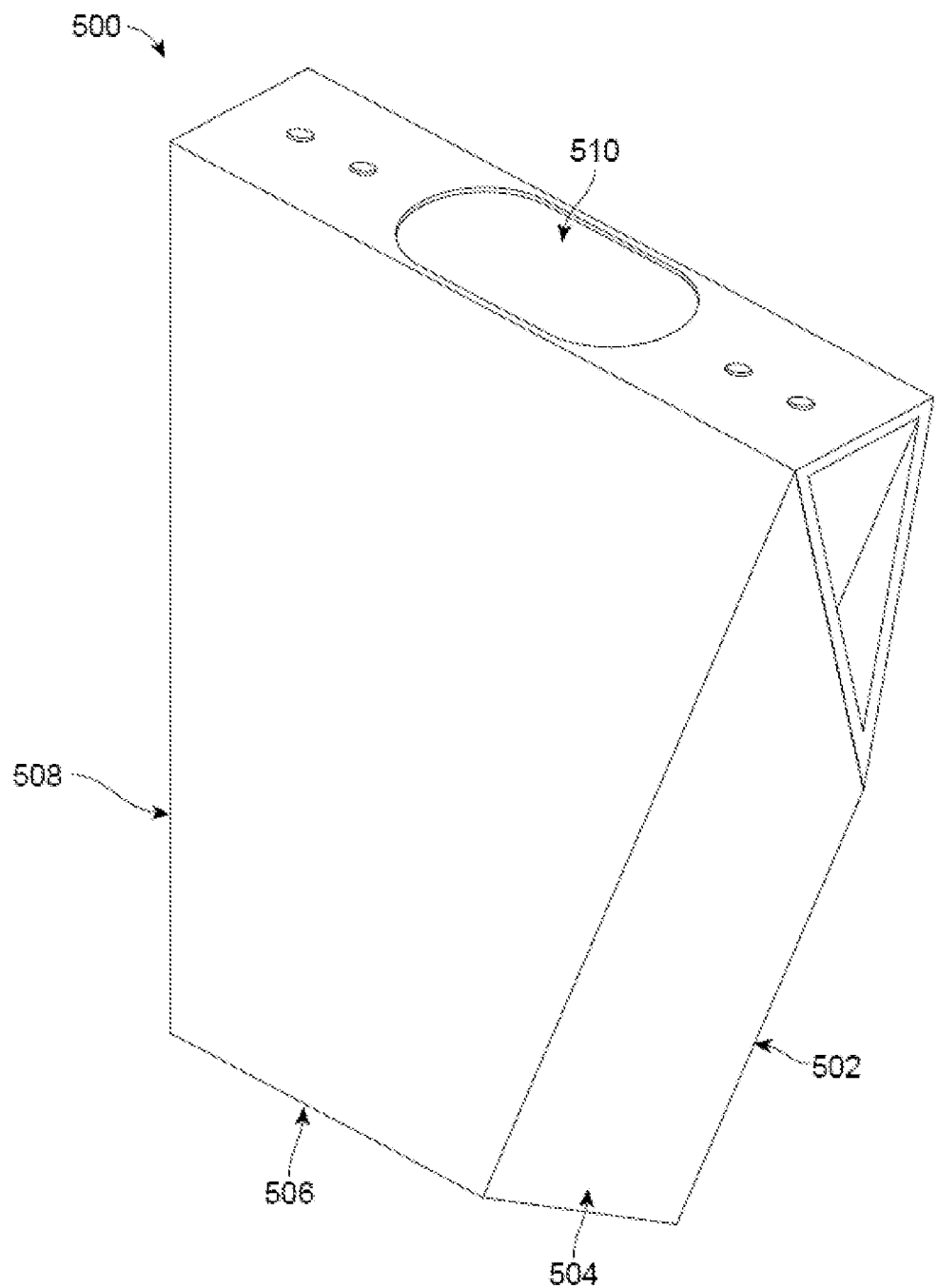
FIG. 5 is a component block diagram of a plow blade according to an embodiment.

FIG. 5 illustrates an embodiment plow blade 500. In an embodiment, the plow blade 500 may be made from 1/16 inch stainless steel. In an embodiment, the plow blade 500 may be hollow and configured to direct the cable array to the bottom of a trench created by nozzle(s) of a jetting system. As an example, the plow blade 500 may be configured to form a center opening 510 through which a cable array may pass into the plow blade 500. An additional opening may be formed at the bottom side 506 or back side 508 of the plow blade 500 to allow the cable array to pass out of the plow blade 500 and be deposited in the trench as the plow blade 500 passes through the trench. In an embodiment, the plow blade 500 may be 13.5 inches tall with a cutting edge 504 of 8 inches. In an embodiment, only the bottom few inches of the plow blade 500 may be actually embedded in and act upon by the sand of the sea floor during operation. In an embodiment, the vertical angle of the front face 502 of the plow blade may be less than 90 degrees, for example between 90 and 80 degrees, between 85 and 80 degrees, approximately 85 degrees, and/or approximately 80 degrees, to minimize vertical soil reaction forces on the plow and minimize the effective length of the plow 500.

Figure 6:
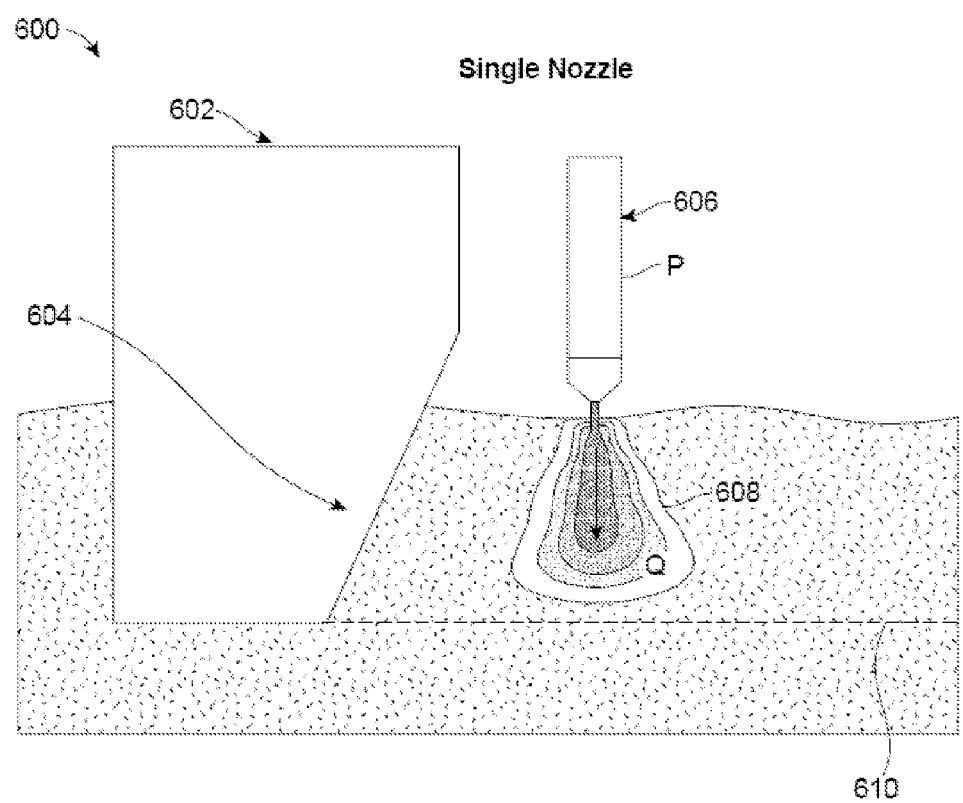
FIG. 6 illustrates a single nozzle sea floor burial system according to an embodiment during burial operations.

In an embodiment, a jetting system of a sea floor cable burial system may have a single nozzle for spraying a jet of water onto the sea floor in an intended path of the plow. FIG. 6 illustrates an embodiment sea floor cable burial system 600 including a single nozzle 606. Sea floor cable burial system 600 may include a nozzle 606 disposed in front of a front face 604 of a plow blade 602. In an embodiment, the nozzle 606 may be a straight flow nozzle. In an embodiment, the nozzle 606 may be vertically offset from the bottom of the plow blade 602 by a distance greater than the intended trench depth 610, such as 0.5 to 1.0 inches greater than the intended trench depth 610. As an example, the intended trench depth 610 may be 4 inches, and the vertical offset between the intended trench depth 610 and nozzle 606 may be 4.5 inches. In this manner, the vertical offset of the nozzle 606 may be 0.5 inches greater than the intended trench depth 610. As illustrated in FIG. 6, in operation nozzle 606 may spray a jet of water 608 onto the sea floor into an intended path of the plow blade 602. The jet of water 608 may liquidize the sea floor sediment and the plow blade 602 may pass through the liquidized sea floor sediment with little resistance to complete the creation of trench. In an embodiment, the plow blade 602 may be configured to deposit the cable array in the trench at the intended trench depth 610 as the plow blade 602 moves through the trench.

Figure 7:
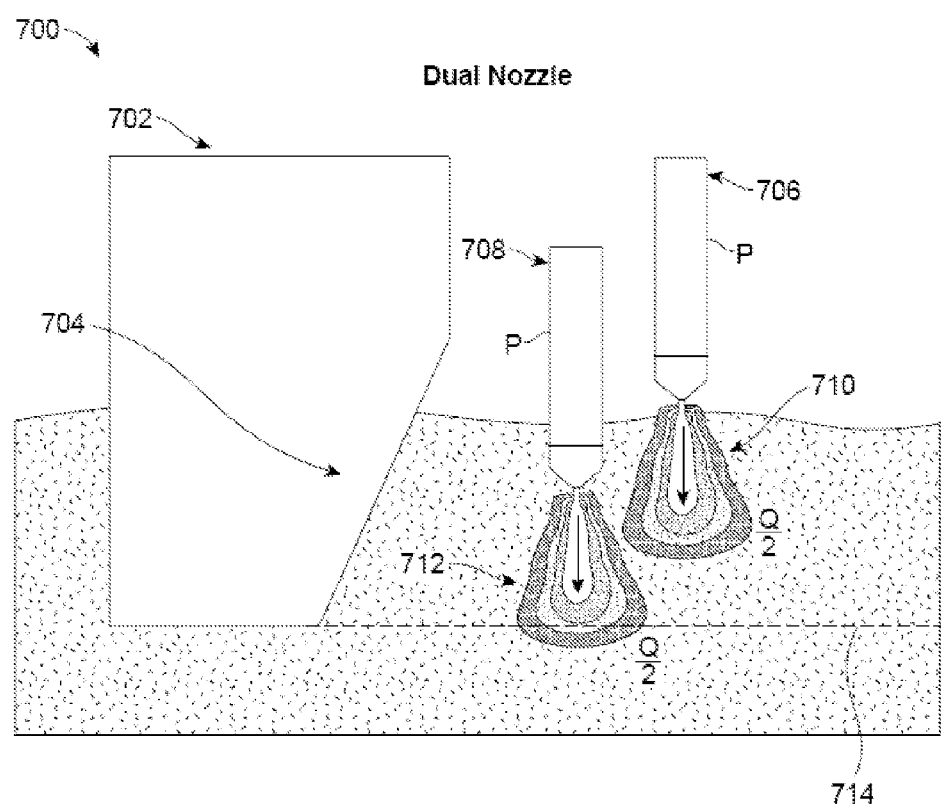
FIG. 7 illustrates a double nozzle sea floor burial system according to an embodiment during burial operations.

In an embodiment, a jetting system of a sea floor cable burial system may have more than one nozzle, such as two nozzles, three nozzles, more than three nozzles, etc., for spraying a jet of water onto the sea floor in an intended path of the plow. FIG. 7 illustrates an embodiment sea floor cable burial system 700 including two nozzles 706 and 708 disposed in front of the front face 704 of a plow blade 702 for spraying two jets of water 710 and 712, respectively, onto the sea floor in an intended path of the plow blade 702. In this embodiment, the second nozzle 708 may be disposed between the forward nozzle 706 and the front face 704 of the plow blade 702. In an embodiment, the two nozzles 706 and 708 may be placed close to the sea floor to minimize water jet energy lost in eddy effects and maximize soil fluidization. In an embodiment, the two nozzles 706 and 708 may be single stream units with a zero degree cone angle. In an embodiment, the two nozzles 706 and 708 may be placed at different heights relative to the seafloor and each may use half the pumped flow to maximize trenching efficiency. In an embodiment, the opening of the forward nozzle 706 may be vertically offset from bottom side of the plow blade 702 by more than the intended trench depth 714. As an example, the more forward nozzle 706 may be placed between 0.5 and 1.0 inches above the sea floor. In an embodiment, the vertical offset between the opening of the second nozzle 708 and the bottom of the plow blade 702 may be less than the intended trench depth 714. In this manner, the second nozzle 708 closest to the plow blade 702 may be placed below the first nozzle 706, for example about 2.0 inches below the first nozzle 706, such that the jet of water 710 sprayed from the first nozzle 706 may liquidize the sea floor sediment to open a first upper portion of the trench and the jet of water 712 sprayed from the second nozzle 708 may use its full energy to liquidize the sea floor sediment to open the remaining deeper portion of the trench prior to the plow blade 702 passing through the trench.

Water sprayed from the most forward nozzle 706 may need some time to travel a few inches and fluidize the layers of sand below. As the sea floor cable burial system 700 advances, the first nozzle 706 may liquefy the sand and begin the trenching operation by displacing sand somewhat over half-way to the intended trench depth 714 before its energy is dissipated and the soil is liquefied and held in suspension. The second nozzle 708 may then reach the point at which the first nozzle's 706 energy dissipated. If the second nozzles 708 reaches this point too late, the initially liquefied soil will settle in the trench and some of the energy in the second nozzle 708 may have to be used to re-suspend the soil again. If the second nozzle 708 arrives too early, the full effect of the first nozzle 706 may not have been realize in the sand, wasting energy. In an embodiment, the cable burial system 700 may move along the sea floor at average speeds of 0.33 to 0.5 knots which may minimize drag forces on cable burial system 700 and/or any ABV the cable burial system 700 may be a part of. In an embodiment, the horizontal separation between the nozzles 706 and 708 and plow blade may be between 1.2 and 2 inches, such as 1.5 inches. Testing of a two nozzle cable burial system shows that separation of 4 inches to 5 inches between nozzles 706 and 708 may not be ideal because that separation allowed for soil re-settling before the second nozzle 708 effect could be realized, and that separations smaller than 1 inch may not be ideal because a less than 1 inch nozzle separation may slow down the rate of advance of an ABV.

Figure 8:
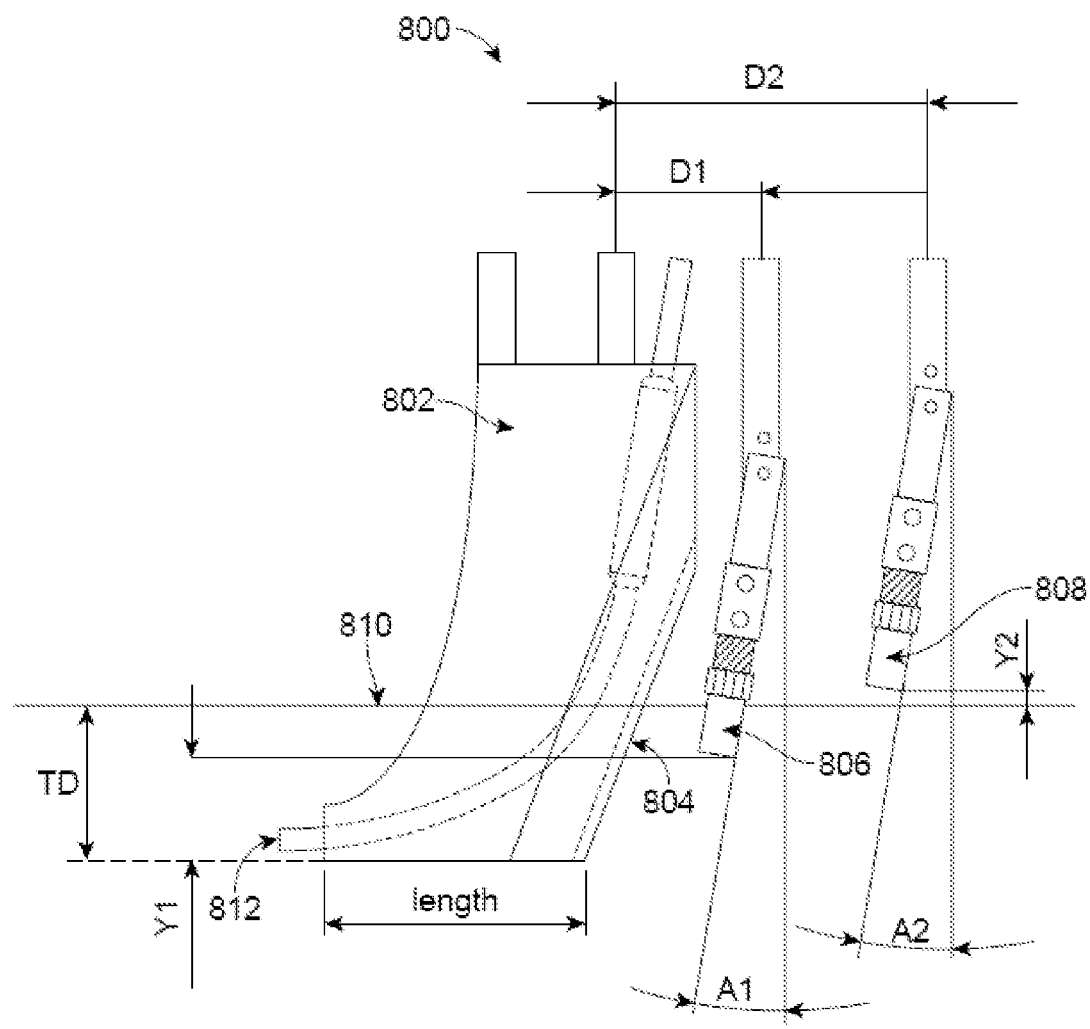
FIG. 8 is a component block diagram of a double nozzle sea floor burial system according to an embodiment.

FIG. 8 illustrates an embodiment sea floor cable burial system 800 including a plow blade 802, a first nozzle 808, and a second nozzle 806. The first nozzle 808 and the second nozzle 806 are disposed in front of the front face 804 of the plow blade 802 and configured to spray jets of water onto the sea floor in an intended path of the plow blade 802. In an embodiment, the vertical angle of the front face 804 of the plow blade 802 may be less than 90 degrees, for example approximately 85 degrees. The plow blade 802 of the sea floor cable burial system 800 may be hollow and configured to direct a cable 812 into a trench created by the sea floor cable burial system 800. In an embodiment, the trench created by the sea floor cable burial system 800 may have a trench depth TD. The trench depth TD may be measured from the soil line 810 representing the sea floor bottom to the bottom of a trench created by the sea floor cable burial system 800.

The second nozzle 806 may be disposed between the first nozzle 808 and the front face 804 of the plow blade 802. The first nozzle 808 may be a horizontal distance D2 away from the front face 804 of the plow blade 802. In an embodiment, the distance D2 may be 5.2 inches, more than 5.2 inches, or less than 5.2 inches, such as 5.1 inches, 5.0 inches, 4.9 inches, or less than 5.0 inches. The second nozzle 806 may be a horizontal distance D1 away from the front face 804 of the plow blade 802. In an embodiment, the distance D1 may be 3.8 inches, more than 3.8 inches, or less than 3.8 inches, such as 3.7 inches, 3.6 inches, or less than 3.5 inches.

In an embodiment, one or both of the nozzles 806, 808 may be tilted (i.e., angled with respect to the vertical direction) toward the plow blade 802. The first nozzle 808 may be angled toward the plow blade 802 such that the first spray angle A2 for the first nozzle 808 may be between 0 to 15 degrees from vertical. The second nozzle 806 may be angled toward the plow blade 802 such that the second spray angle A1 for the second nozzle 806 may be between 0 to 15 degrees from vertical. In an embodiment, the spray angles A1 and A2 may be the same. In another embodiment, the spray angles may be different. As an example, the spray angle A1 of the second nozzle 806 may be 15 degrees from vertical and the spray angle A2 of the first nozzle 808 may be 10 degrees from vertical. In an embodiment, either or both of the spray angles A1 and A2 may be selected such that the jets of water from the nozzles 806, 808 are sprayed in a direction parallel to the front face 804 of the plow blade 802. As an example, the vertical offset of the front face 804 of the plow blade 802 may be approximately 85 degrees and either or both of the spray angles A1 and A2 may be approximately 15 degrees. As another example, the vertical offset of the front face 804 of the plow blade 802 may be approximately 80 degrees and either or both of the spray angles A1 and A2 may be from approximately 10 degrees to approximately 15 degrees. The angling of one or both of the nozzles 806, 808 toward the plow blade 802 may increase the efficiency of the trenching process. The inclined jet(s) from the angled nozzle(s) 806, 808 may be configured to generate a current that helps to redirect the sediment below and around the back of the plow blade 802, helping the plow blade 802 to move through the trench with little resistance. In an embodiment, the spray angle A2 may be zero degrees from vertical, thereby directing the jet of water vertically into the sea floor to enable for maximum depth penetration.

In an embodiment, the nozzles 806 and 808 may be at different heights relative to each other. In an embodiment, a first vertical offset between an opening of the first nozzle 808 and the bottom side of the plow blade 802 may be a distance Y2 greater than the intended trench depth TD. As an example, the distance Y2 may be approximately 0.5 inches, resulting in the vertical offset of the opening of the first nozzle 808 and the bottom of the plow blade 802 being approximately 0.5 inches greater than the intended trench depth TD. In this manner the opening of the first nozzle 808 may be approximately 0.5 inches above the soil line 810. In an embodiment, a second vertical offset distance Y1 between an opening of the second nozzle 806 and the bottom side of the plow blade 802 may be less than the intended trench depth TD. In an embodiment, the second vertical offset distance Y1 may vary based on the intended trench depth TD. As an example, when the intended trench depth TD is approximately 4 inches, the second vertical offset distance Y1 may be approximately 2.0 inches. In this manner, the opening of the second nozzle 806 may be approximately 2.0 inches below the soil line 810 during trenching operations. As another example, when the intended trench depth TD is approximately 6 inches, the second vertical offset distance Y1 may be approximately 3.5 inches. In this manner, the opening of the second nozzle 806 may be approximately 2.5 inches below the soil line 810 during trenching operations. As a still further example, when the intended trench depth TD is approximately 8 inches, the second vertical offset distance Y1 may be approximately 4.5 inches. In this manner, the opening of the second nozzle 806 may be approximately 3.5 inches below the soil line 810 during trenching operations.

Figure 9:
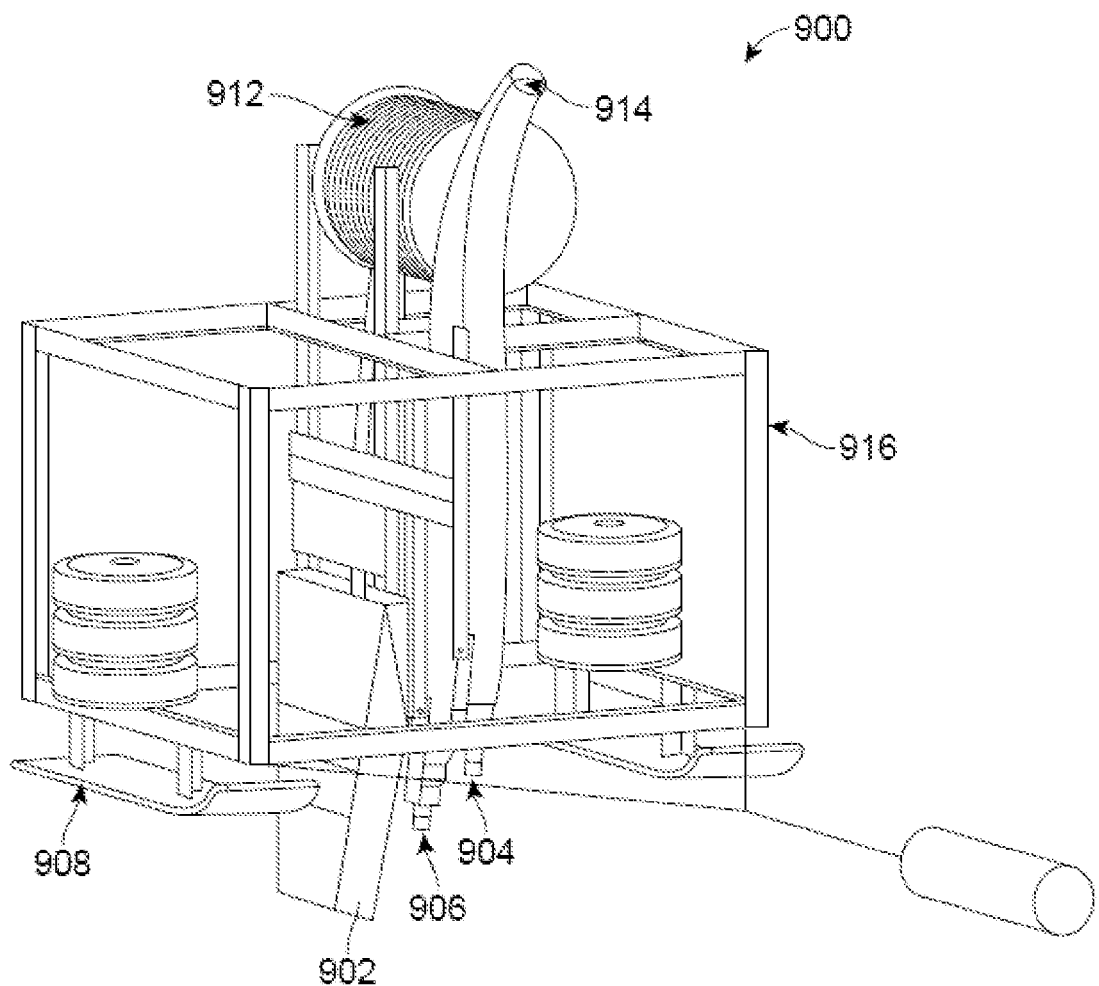
FIG. 9 is component block diagram of a cable burial subsystem according to an embodiment.

FIG. 9 illustrates an embodiment cable burial subsystem 900. In an embodiment, cable burial subsystem 900 may be configured to be towed across the sea floor by another vehicle, such as a manned or unmanned surface ship or manned or unmanned submarine, or cable burial subsystem 900 may be autonomous if incorporated into an ABV. The cable burial subsystem 900 may include a plow 902 and jetting system including two nozzles 904 and 906. The two nozzles 904 and 906 may be provided water via a supply water feed 914 that may be coupled to the vehicle towing the cable burial subsystem 900 or directly by a pump and motor incorporated into the overall ABV of which the cable burial subsystem 900 may be part. The cable burial subsystem 900 may be supported in a frame 916. The frame 916 may also support a cable reel 912 which may provide the cable array through the plow 902 to be laid in the trench created by the cable burial subsystem 900. In an embodiment, the frame 916 may include Teflon® coated skids 908 which may enable the cable burial subsystem 900 to ride along the sea floor.

Figure 10:
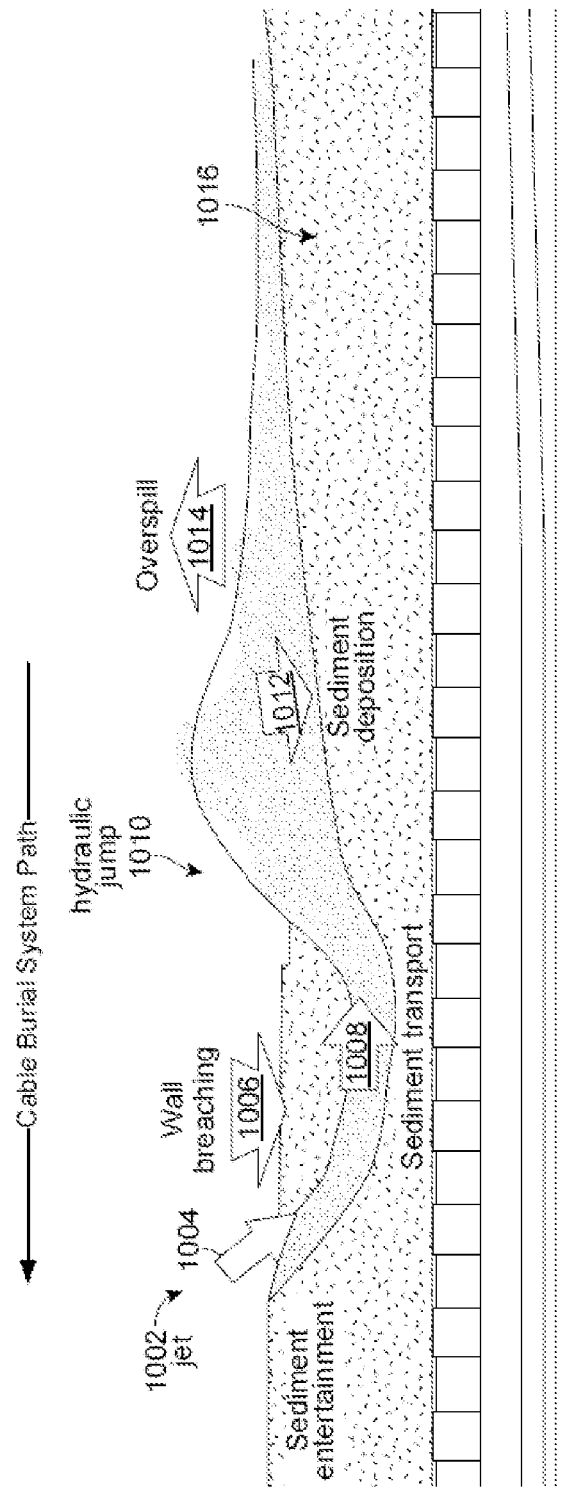
FIG. 10 is a hydraulic movement diagram illustrating the sea floor during burial operations with a sea floor cable burial system according to the various embodiments.

FIG. 10 is a hydraulic movement diagram illustrating the sea floor 1016 during cable burial operations with a sea floor cable burial system. In FIG. 10 the cable burial system may include at least one nozzle disposed in front of a front face of a plow blade and configured to spray a jet of water 1002 onto the sea floor 1016 in an intended path of the plow blade. FIG. 10 illustrates the cable burial system traveling a path from right to left. In an embodiment, the nozzle of the sea floor cable burial system closest to the plow blade may be angled toward the plow blade, for example at a nozzle angle of approximately 15 degrees from vertical. In this manner, the jet of water 1002 sprayed onto the sea floor 1016 may be angled toward the plow blade. The angled jet of water 1002 may impact the sea floor 1016 at area 1004 and liquefy the sediment of the sea floor 1016. In area 1006 the movement and turbulence of the sediment in suspension around the plow blade, the trenching action of the plow blade itself, and the high velocity of the water jet 1002 may cause trench wall breaching, and in area 1008 the sediment in suspension may be transported around the plow blade of the cable burial system generating further turbulence and trench wall breaching. As the current slows toward the back of the plow blade in area 1010 a hydraulic jump may be generated. As the current slows down towards the back of the plow blade the water velocity may be rapidly reduced allowing the sediment in suspension to settle back down in area 1012 and overspill the buried cable in area 1014 backfilling most of the incised trench. The combination of breaching and over-spilling of suspended sediment may leave the trench filled to about 75% to 80% of the original trench depth. In sandy soils, the backfilled soil deposited behind the plow blade may not immediately consolidate and may remain soft for several minutes or longer.

Figure 11:
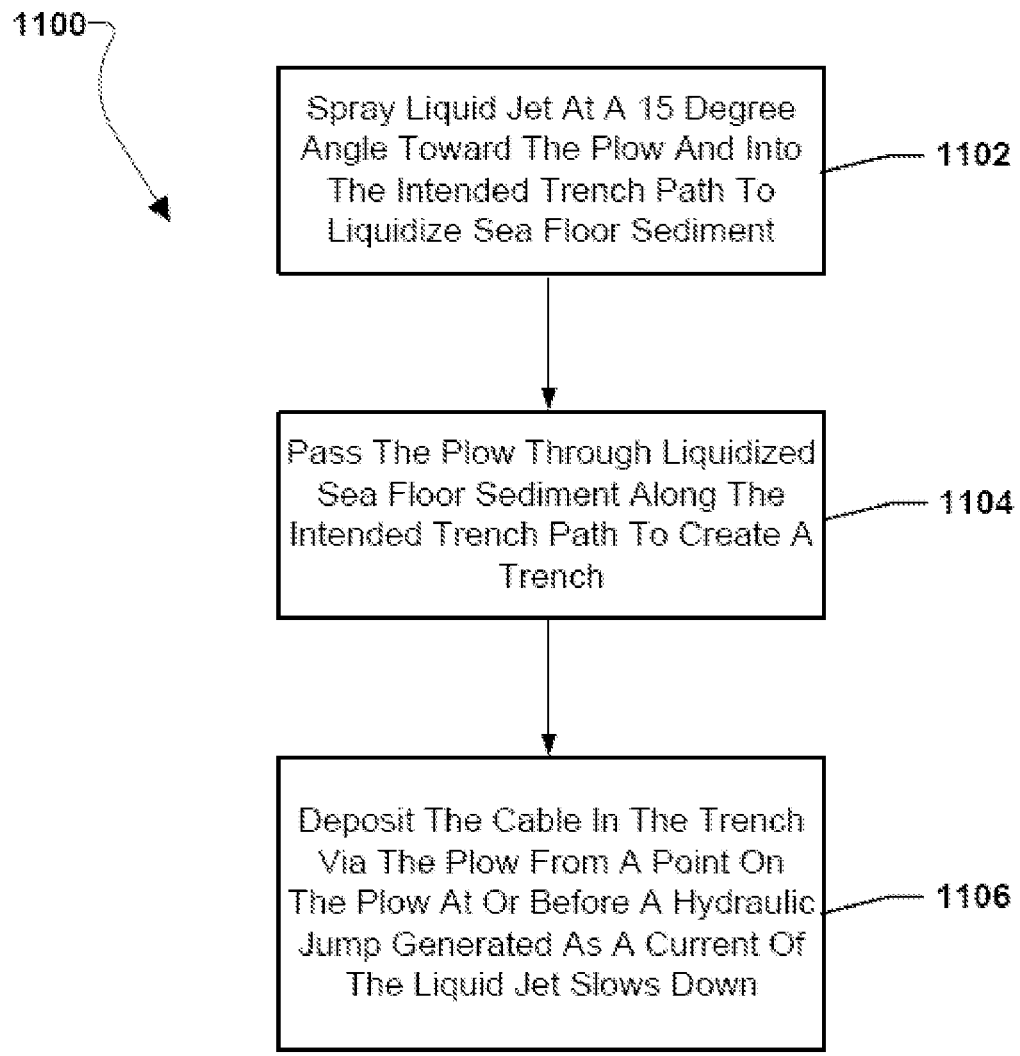
FIG. 11 is a process flow diagram illustrating an embodiment method for burying a cable in sea floor sediment.

FIG. 11 illustrates an embodiment method 1100 for burying a cable in sea floor sediment. The operations of method 1100 may be performed by any of the embodiment ABV's described herein. At block 1102 the ABV may spray a jet of liquid, such as water, at a 15 degree angle toward the plow of the ABV and into an intended trench path to liquidize the sea floor sediment. At block 1104 the ABV may pass a plow through the liquidized sea floor sediment along the intended trench path to create a trench. At block 1106 the ABV may deposit the cable in the trench via the plow from a point on the plow at or before a hydraulic jump generated as a current of the liquid jet slows down.

Figure 12:
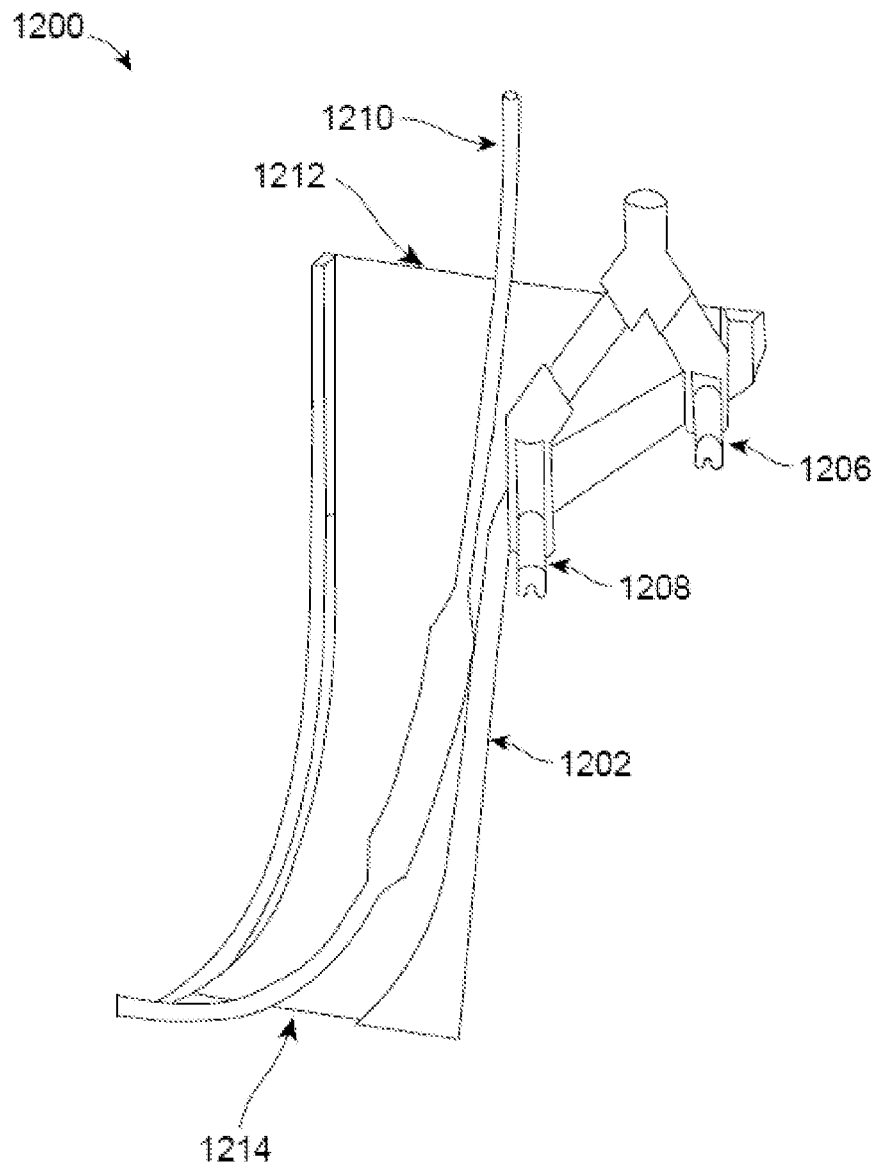
FIG. 12 is component block diagram illustrating a cutaway side view of an integrated double nozzle and plow sea floor cable burial system according to an embodiment.

FIG. 12 illustrates a cut-away side view of an embodiment sea floor cable burial system 1200. The sea floor cable burial system 1200 may include a first nozzle 1206 and a second nozzle 1208 which may be integrated into the plow blade 1202 such that the first nozzle 1206 and second nozzle 1208 are integral parts of the plow blade 1202. In an embodiment, the plow blade 1202 may be hollow and configured to form a first opening 1212 in the top of the plow blade 1202 and a second opening 1214 in the bottom of the plow blade 1202. In an embodiment, a cable array 1210 may be passed through the plow blade 1202 and deposited in a trench formed by the sea floor cable burial system 1200. Incorporating the nozzles 1206 and 1208 with the plow blade 1202 may be desirable to minimize possible entanglements of the nozzles 1206 and 1208 with seabed obstacles, such as rocks, coral, plants, etc. In an embodiment, when a jetting system is used in combination with the plow blade 1202, the plow blade 1202 may not need to support a high load, so there may be no need for the heavy blades used in conventional plowing operations which are being pulled with tensions of tens of tons.

Jetting tests were conducted using some of the embodiments described above. To conduct these tests, a movable sled, containing the plow blade and jets, was installed on top of a fiberglass tank. The sled was moved forward using a constant pull force to mimic thruster force and allow calculation of energy requirements. Adjustment could be made to the jetting system and plow blade depth, the amount of pull-force, and the flow and pressure through the nozzles. A Baldor Reliance 2 hp pump was used to provide water flow, and a manifold system that included a valved bypass pipe allowed experimentation over a wide range of pressures and flows. During testing it was noted that the trench width varied slightly along the path, but was fairly consistent throughout the length of the test. In testing it was shown that a trench that was initially 8 inches deep, was rapidly backfilled to about 6 to 7 inches by the sediments that were in suspension after the plow blade went through the fluidized zone. Based on the jetting tests, it was determined that because of the large width of the trench, the energy required for a 1 inch or 1.5 inch wide plow blade and cable elements may be very similar.

Figure 13:
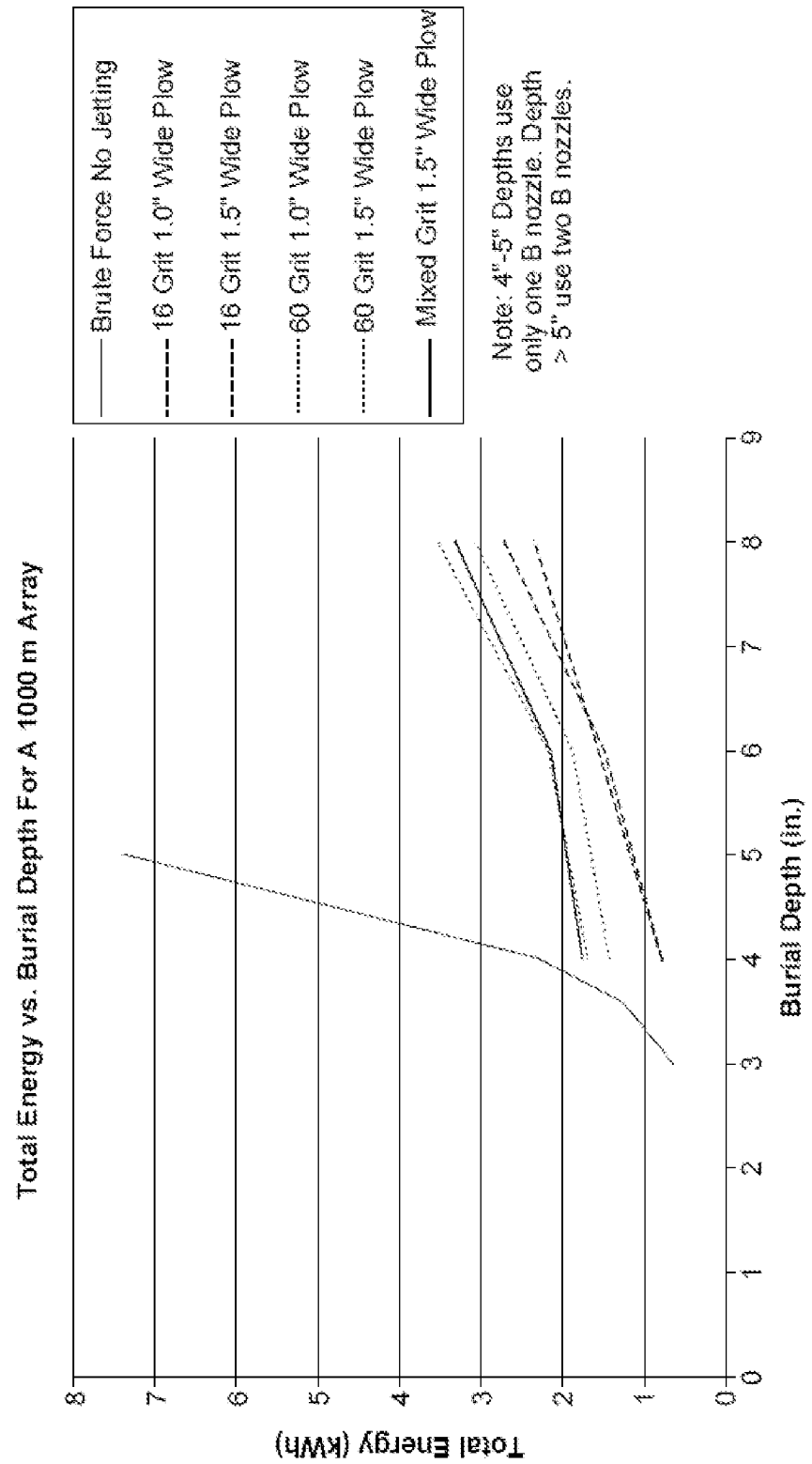
FIG. 13 is a graph of total energy versus burial depth for various sea floor cable burial system tests using a 1000 m long array.

A total of 99 tests were completed using the constructed flume. The tests included tests with two different plow blade widths, three different sand particle sizes, several nozzles types and layouts, and several flows/pressure combinations. The tests were completed for burial depths ranging from 4 inches to 8 inches. FIG. 13 is a graph of total energy required to bury a 1000 m long cable versus burial depth based on various test results. FIG. 13 shows the advantages of using jetting vs. just simply dragging the plow blade through the soil (i.e., "brute" force). The energy required to drag the plow blade without jetting is very large and increases very rapidly as the burial depth increases. As shown in FIG. 13, there was a noticeable difference between the energy required to open the same trench using very coarse, 16 grit, and fine-medium, 60 grit, sands. This difference may be due to the fact that the 60 grit sand may be better compacted (i.e., less voids between the sand grains). For the 16 grit sand, only 7.5 blows with the dynamic Cone Penetrometer were needed to penetrate 4 inches into the soil, while 11 blows were used for the 60 grit sand to achieve the same penetration. The results for the mixed sand, sand made of 80% medium and fine sands, were very similar to those using 60 grit sand. Test results also showed that the thickness of the plow up to 1.5 inches had an insignificant effect on the speed of the trenching. The solid stream angled nozzle was able to open a trench approximately 5 inches wide for both plow blades used, i.e., 1.0 and 1.5 inches wide blades.

Testing also showed that using three nozzles may not be necessary to achieve burial depths of 4.0 to 8.0 inches as there may not be an energy savings with three nozzles at an 8 inch burial depth. Deeper burial depths, for example up to 12 inches, may be realized by increasing the size and flow of the two nozzles or by using a three nozzle cable burial system. In an embodiment, a three nozzle cable burial system may be utilized to bury cables up to a depth of 12 inches. In an embodiment, the third nozzle may be added and the flow to all three nozzles may be 15 gallons per minute. The energy required to bury the cable may be approximately linear with the burial depth.

During testing it was found that increasing pressure above 60 psi did not increase the energy efficiency for burial in the sands tested (see for example tests 13 vs. 14 and 15, 25 vs. 26 in Table 1). This was partially expected given the fact that higher pressure will also generate higher flow velocities and higher losses due to eddy viscosity effects. From a practical point of view, it is also more difficult and expensive to find a submarine pump to deliver a higher pressure differential. In terms of decreasing the pressure below 60 psi, numerous studies completed for large plow operations do not recommend this, as 60 psi is needed to fluidize highly consolidated sands and even higher pressures, e.g., approximately 90 psi, are needed for hard clays. 60 psi may be a good compromise to cover a range of soils and to be able to find appropriate submersible pumps. For shallow trenches (4" to 5") in sands, it may be possible to further decrease the pressure requirements.

TABLE 1

| Test | Plow Width & Grit Size | Pressure (psi) | Flow (gpm) | Burial Depth (in.) | Total Energy Per 1000 m (kW/h) | Nozzle(s) |
|---|---|---|---|---|---|---|
| 13 | 1" Plow 16 Grit | 80 | 15.6 | 5 | 1.980 | 1 Type D |
| 14 | 1" Plow 16 Grit | 60 | 13.7 | 5 | 1.851 | 1 Type D |
| 15 | 1" Plow 16 Grit | 60 | 13.7 | 5 | 1.639 | 1 Type D |
| 25 | 1" Plow 16 Grit | 78 | 25.5 | 6 | 2.228 | 1 Type D 1 Type C |
| 26 | 1" Plow 16 Grit | 60 | 22 | 6 | 2.074 | 1 Type D 1 Type C |

Regarding nozzle geometry, the advantages of using a nozzle pointing towards the plow blade with an angle of 10° to 15° have been previously discussed. Results from test 78 and 79 (see Table 2) shows the difference for one test where the angle was changed from 10° to 0°. This effect was observed early during the tests and that is why the majority of the tests were completed using a nozzle angle of 10° to 15°.

additional energy involved in burying the cable is that associated with the back tension applied, i.e., 1.5 lbs.

TABLE 2

| Test # | Plow Width & Grit Size | Pressure (psi) | Flow (gpm) | Time (s) | Average Speed (ft/sec) | Burial Depth (in) | Total Energy Per 1000 m (kW/h) | Nozzle(s) | Spray Angle (degrees) |
|---|---|---|---|---|---|---|---|---|---|
| 78 | 1.5" Plow Combined | 60 | 14.9 | 54 | 0.21 | 5 | 6.577 | 1 Type B | 0 |
| 79 | 1.5" Plow Combined | 60 | 14.5 | 23.21 | 0.48 | 5 | 2.783 | 1 Type B | 10-15 |

Figure 14:
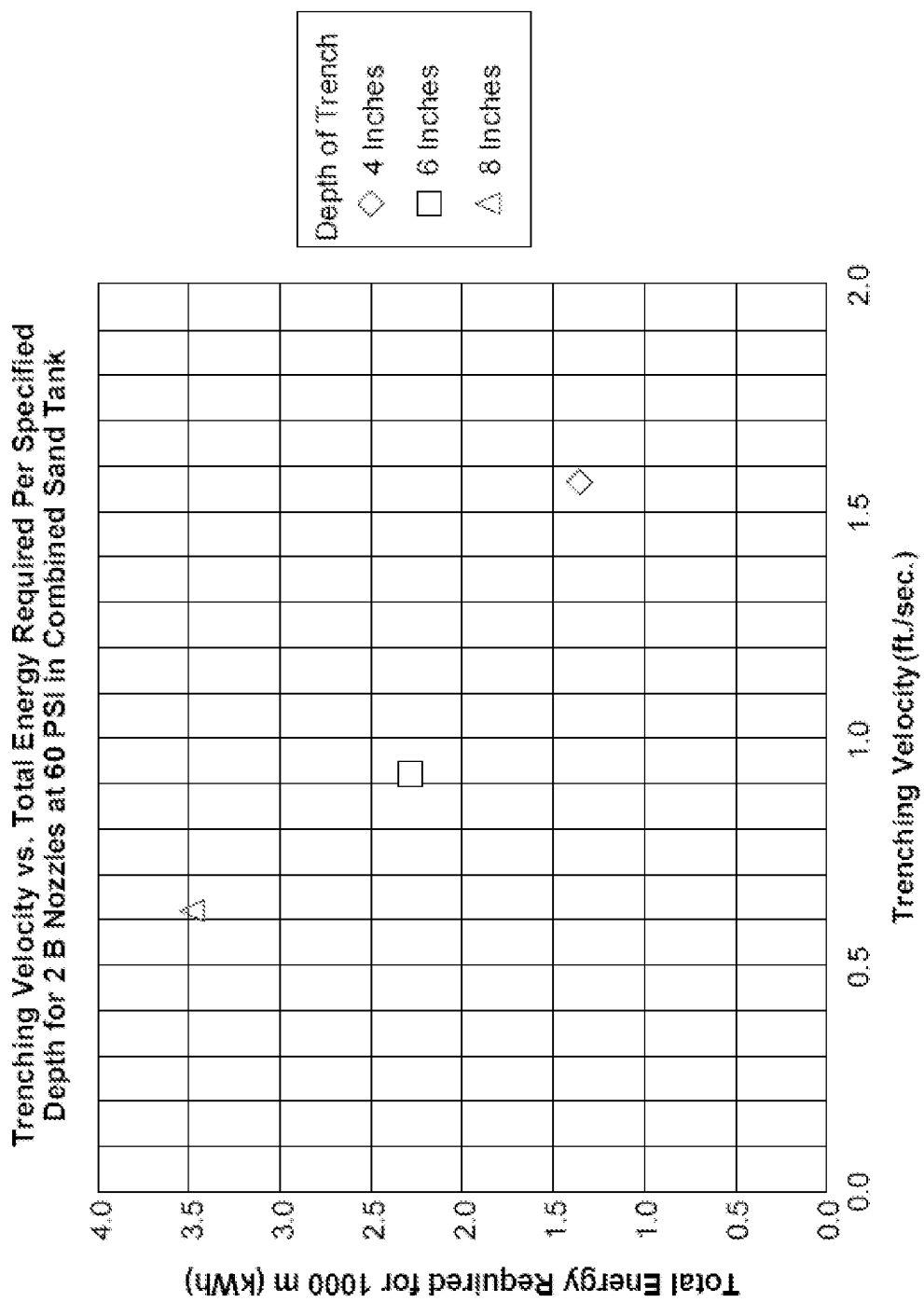
FIG. 14 is a graph of trenching velocity versus total energy required to bury a 1000 m of cable for a specific burial depth for a tested two nozzle cable burial system.

Using similar values of pressure and flow, trenching speed and energy required to create 1000 meter long trench may be functions of the burial depth. FIG. 14 is a graph showing the trenching velocity versus total energy required to open a 1000 meter long trench for different burial depths when using two B (straight) nozzles at 60 psi with a 28.6 gallon per minute flow in a combined sand tank.

The next phase of testing built upon the knowledge gained during the initial trenching tests and added the process of burying a mock-up cable with in-line sensors in the flume. The mock-up cable was created using 7.5 mm, 3 conductor electrical cable with a specific gravity of 2. The in-line sensors were modeled using urethane rubber with steel inserts to achieve the desired specific gravity of 2. The in-line sensors measured 5.5 inches long, 1.25 inches in diameter with 1 inch tapered ends, similar to the dimensions expected for the real sensors. The array with the in-line sensors was loaded onto a 6-inch diameter spool mounted above the plow assembly which had approximately 1.5-lbs of back tension, which was selected to simulate the peel-off tension expected on the actual cable which may be needed to keep the array straight as it is paid out.

Full-scale flume tests were successful in burying the array cable to depths of 4 inches, 6 inches, and 8 inches. In these tests, the plow, jetting nozzles, and cable array spool moved along tracks mounted on top of the tank pulled along horizontally by a constant force. The time for the jet assisted plow to traverse the length of the tank and the pressure and flow rate of the nozzles were recorded and the total energy for cable burial was determined. The total energy for cable burial includes the pull force required to move the plow through the sand as well as the hydraulic energy required to pump water through the 2 nozzles at 28 gpm total and 60 psi.

Figure 15:
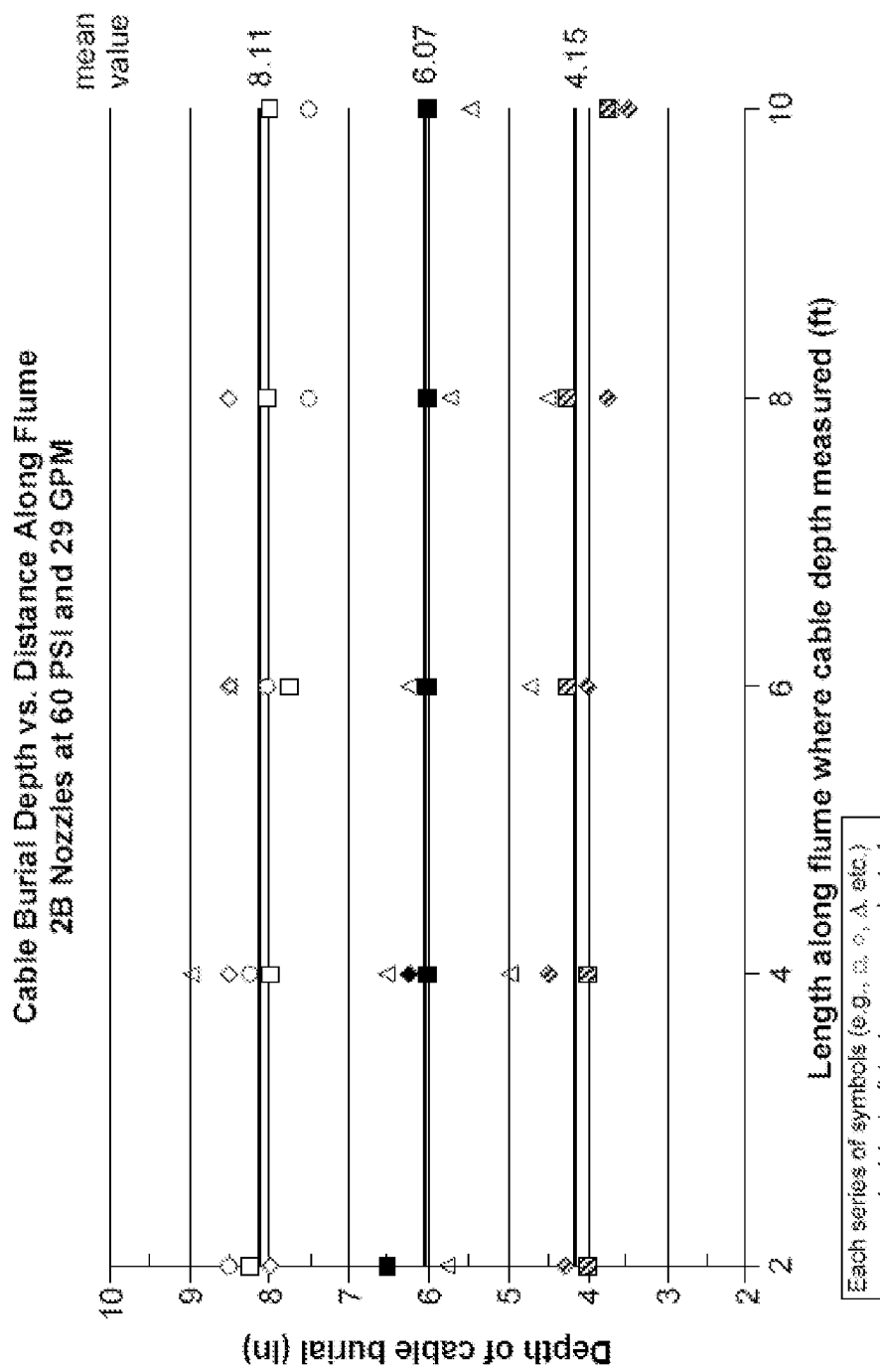
FIG. 15 is a graph of cable burial depth versus distance along a flume for various sea floor cable burial system tests.

Multiple runs were completed at three different plow blade depths (3 runs for 4 inch and 6 inch burial depth and 4 runs for 8 inch burial depth). Once completed the depth of the buried cable below the sand was measured every 2 feet along the flume. The results obtained are shown in FIG. 15. Testing showed that the depth of burial may be very consistent along the length of the flume and in general tends to exceed slightly the target depth (i.e., actual cable depth for target depths of 4 inches, 6 inches and 8 inches were 4.15 inches, 6.07 inches and 8.11 inches, respectively).

Figure 16:
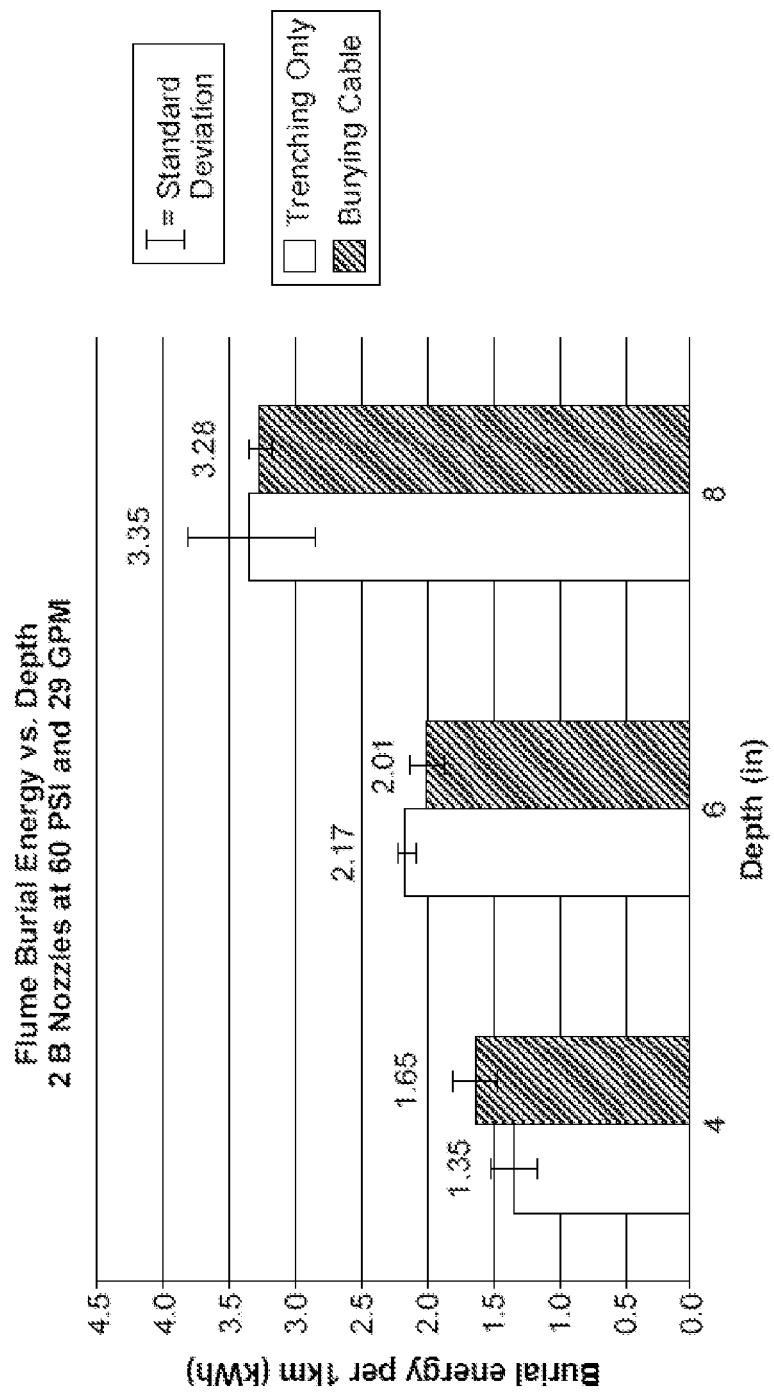
FIG. 16 is a graph of flume burial energy required to bury 1000 m of cable versus burial depth for various sea floor cable burial system tests.

FIG. 16 is a graph showing a comparison of the total average energy required to bury a 1,000 meter long cable 4 inches, 6 inches and 8 inches using a plow blade only and using a plow blade as well as burying a mock-up cable and in-line sensors. The vertical bar assigned to each of the average values shown represents one standard deviation of the tests and is a measure of the variability of the test results observed when the same experiment was repeated 3 to 4 times. As expected, the results are quite similar since the Upon successful completion of the cable burial tests in the flume, full-scale ocean tests were conducted to closer simulate burial in an uncontrolled environment and to validate the tests performed previously. The most efficient system designs (i.e., nozzles types and geometries, and fluid pressures and flows) determined for the three burial depths in the previous flume tests were used in the ocean test in order to further evaluate the system under more realistic conditions. A sea sled including a jetting system and plow was used as the ABV. These were the first set of experiments that tested the integration of skids for use with the ABV. The results from the ocean test were used to not only validate the results obtained in the flume tests, but also to provide valuable information on potential issues regarding the use of skids and jet assisted plowing useful in ABV design.

Ocean testing of the jet assisted plowing using the parameters originally configured with the flume experiments allowed for successful cable burial for all experimental runs completed in the ocean. A minimum of three tests were completed for each ocean test involving fixed experimental conditions. The burial system tested was highly reliable in the ocean and even with the presence of small rocks and debris and patches of different sand sizes and compaction levels, successful cable burial was accomplished in every run.

Figure 17:
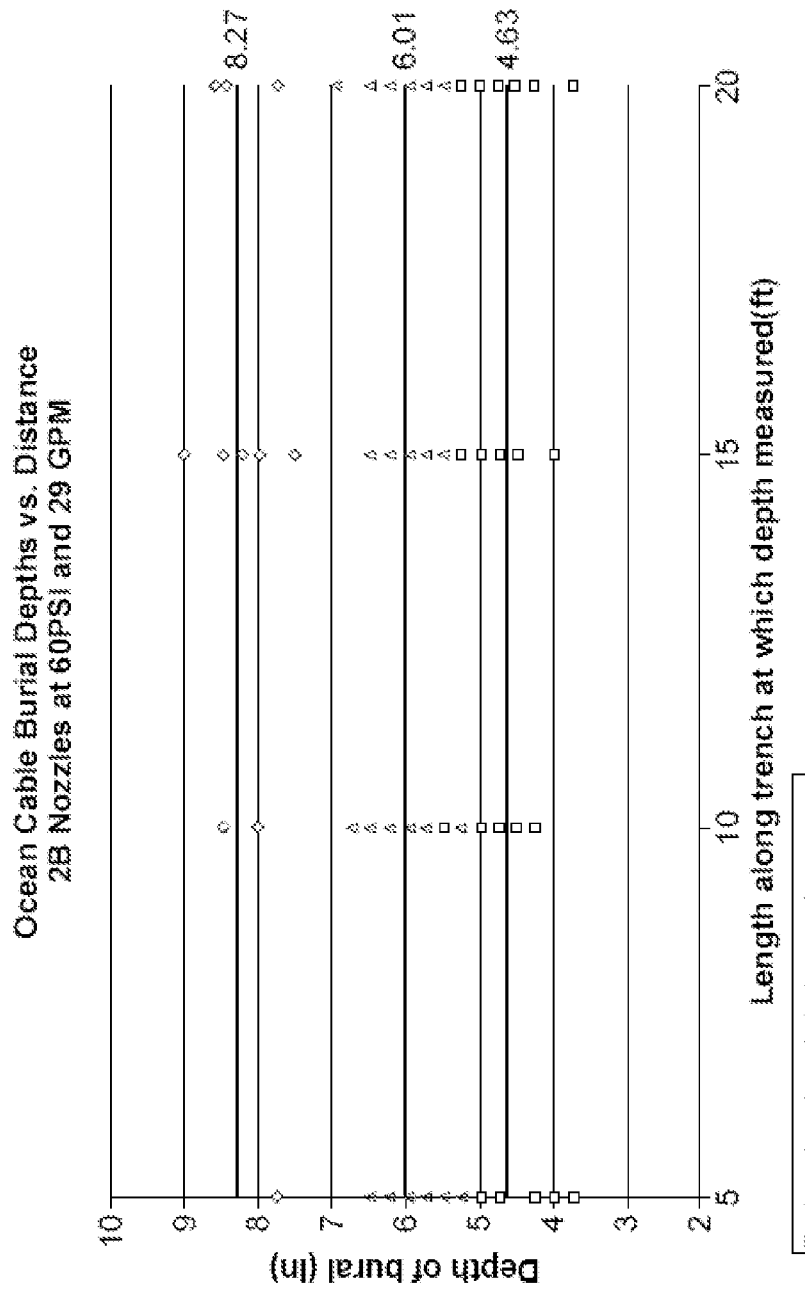
FIG. 17 is a graph of ocean cable burial depths versus distance for a tested two nozzle cable burial system.

The depth of burial along the length of the trench for each ocean test is presented in FIG. 17 with average burial depths of 4.63, 6.01, and 8.27 inches for target depths of 4, 6, and 8 inches. The spread in the data can also be graphically observed in FIG. 17. In all cases, the average depth of cable burial exceeded the target depth of burial, specifically by up to 0.6 inches in the 4 inch burial case.

Figure 18:
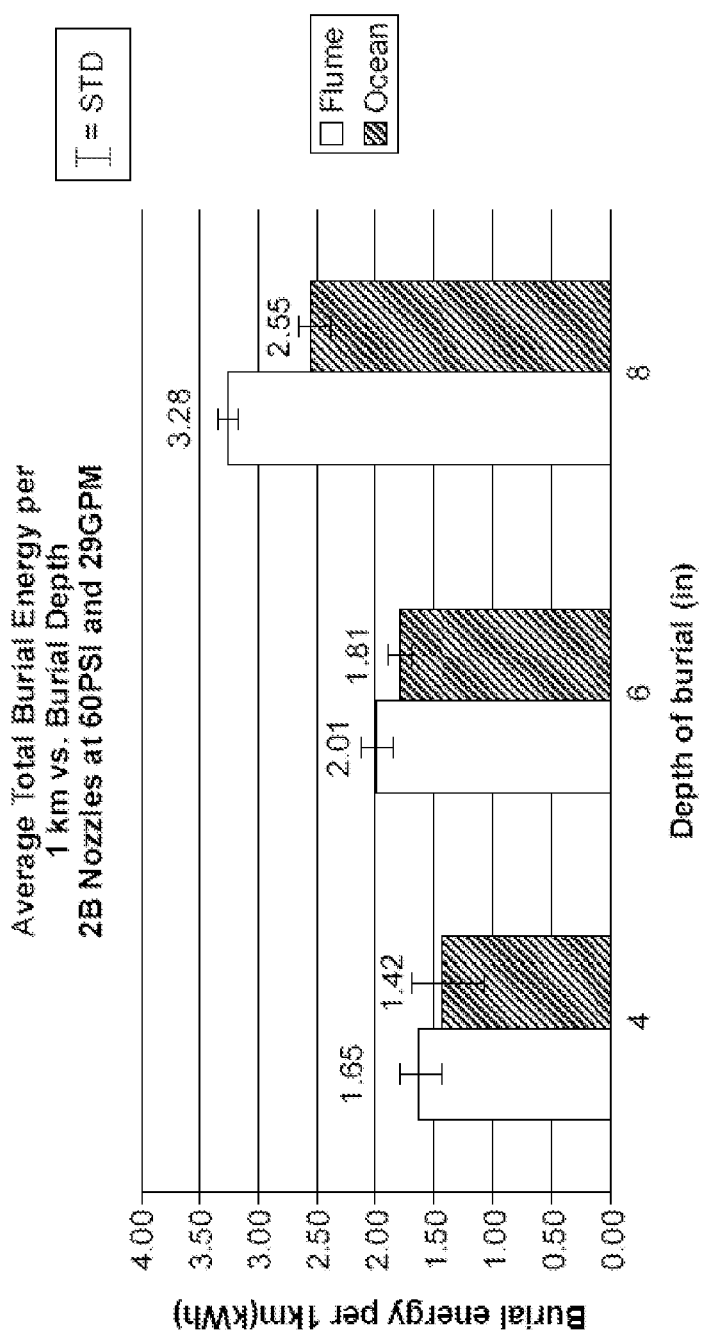
FIG. 18 is a graph of the average total burial energy per 1 km versus burial depth for a tested two nozzle cable burial system.
Figure 19:
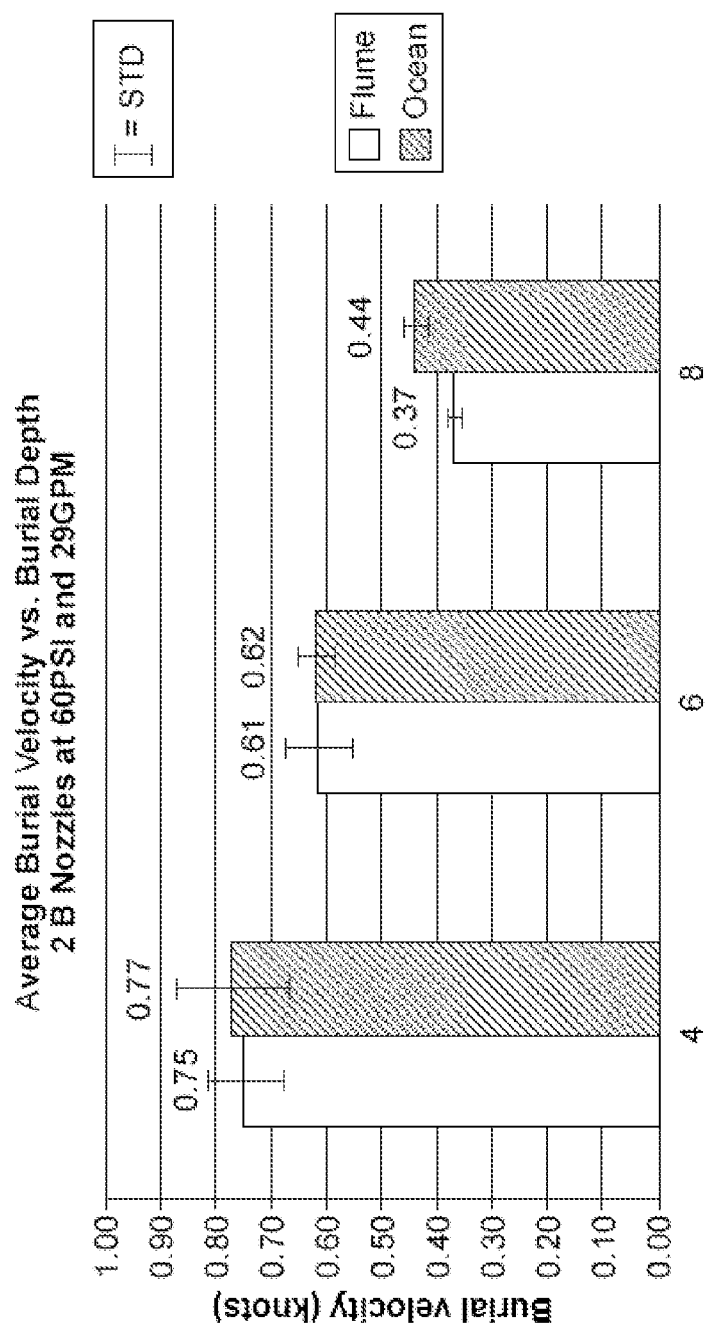
FIG. 19 is a graph of the average burial velocity versus burial depth for a tested two nozzle cable burial system.

FIGS. 18 and 19 are graphs illustrating the results obtained from ocean tests and how they compare with results obtained in flume tests. The results represent the average total energy required to bury a 1,000 m long array and burial velocity at 4 inches, 6 inches and 8 inches burial depth. These results are for the Teflon® covered skids. The vertical bar assigned to each average value represents one standard deviation and is a measure of the variability of the test results observed when the same experiment was repeated 3 times.

As can be seen in FIGS. 16 and 17, burial energy for 1,000 meters and burial velocity for 4 and 6 inch trenching depths in the ocean are within one standard deviation from the results obtained in the flume, while for the 8 inch trenching depths they are not. The difference between the flume and ocean tests are difficult to compare statistically based on only three data points for each test condition. It is believed that the differences were mainly due to the natural variability of the environment (i.e., sand type, debris along the track, etc.) and degree of compaction. The overall jetting method worked similarly in both environments, and it was shown that the designed burial system allowed for consistent and predictable burial performance, achieving similar velocities and somewhat less energy than those found in the flume experiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An array burial vehicle, comprising:
   a cable burial mechanism, comprising:
      a plow blade;
      a first nozzle disposed in front of a front face of the plow blade and configured to spray a first jet of water onto the sea floor in an intended path of the array burial vehicle; and
      a second nozzle disposed between the first nozzle and the front face of the plow blade and configured to spray a second jet of water onto the sea floor in the intended path of the array burial vehicle;
   a pump connected to the first nozzle and the second nozzle, and configured to provide water to the first nozzle and the second nozzle;
   a cable pack configured to hold a cable array;
   at least one ski configured to ride along the sea floor;
   at least one thruster configured to propel the array burial vehicle along the sea floor;
   a battery;
   an electric pump motor connected to the battery and the pump, the electric pump motor configured to drive the pump;
   a high pressure air tank; and
   an inflatable ballast connected to the high pressure air tank and configured to provide buoyancy for the array burial vehicle when inflated with air from the high pressure air tank,
   wherein the battery is connected to the at least one thruster and configured to provide power to the electric pump motor and the at least one thruster.

2. The array burial vehicle of claim 1, wherein the front face of the plow blade has a vertical angle of less than 90 degrees.

3. The array burial vehicle of claim 2, wherein the vertical angle is within the range of 80 degrees to 85 degrees.

4. The array burial vehicle of claim 3, wherein the front face of the plow blade comprises a cutting edge of at least 8 inches.

5. The array burial vehicle of claim 1, wherein the plow blade comprises a hollow portion configured to direct the cable array into a trench created by the array burial vehicle.

6. The array burial vehicle of claim 1, wherein the first nozzle is configured at a first spray angle of between 0 degrees to 15 degrees from vertical toward the plow blade and the second nozzle is configured at a second spray angle of between 0 degrees to 15 degrees from vertical toward the plow blade.

7. The array burial vehicle of claim 6, wherein the first spray angle is 10 degrees from vertical toward the plow blade and the second spray angle is 15 degrees from vertical toward the plow blade.

8. The array burial vehicle of claim 6, wherein the first nozzle and the second nozzle are separated by a vertical distance of 5 inches or less.

9. The array burial vehicle of claim 8, wherein a horizontal distance between the first nozzle and the second nozzle is 1.5 inches or less.

10. The array burial vehicle of claim 6, wherein the front face of the plow blade and the first nozzle are separated by a first horizontal distance of 5.2 inches or less, and the front face of the plow blade and the second nozzle are separated by a second horizontal distance of 3.8 inches or less.

11. The array burial vehicle of claim 1, wherein:
    the first nozzle includes a first nozzle opening and is configured such that the first nozzle opening is vertically offset from a bottom side of the plow blade by a first vertical offset amount that is greater than an intended trench depth; and
    the second nozzle includes a second nozzle opening and is configured such that the second nozzle opening is vertically offset from the bottom side of the plow blade by a second vertical offset amount that is less than the intended trench depth.

12. The array burial vehicle of claim 11, wherein the first vertical offset is approximately 0.5 inches greater than the intended trench depth.

13. The array burial vehicle of claim 12, wherein the intended trench depth is 4 inches and the second vertical offset is approximately 2 inches.

14. The array burial vehicle of claim 12, wherein the intended trench depth is 6 inches and the second vertical offset is 2.5 inches.

15. The array burial vehicle of claim 12, wherein the intended trench depth is 8 inches and the second vertical offset is 3.5 inches.

16. The array burial vehicle of claim 1, wherein the pump is further configured to provide the water with equal hydraulic pressure to the first nozzle and the second nozzle.

17. The array burial vehicle of claim 16, wherein the hydraulic pressure is 60 pounds per square inch or less and a water flow rate through both the first nozzle and the second nozzle is 14.5 gallons per minute or less.

18. The array burial vehicle of claim 16, wherein the first nozzle and the second nozzle are straight flow nozzles.

19. The array burial vehicle of claim 1, wherein the first nozzle and the second nozzle are integral parts of the plow blade.

20. The array burial vehicle of claim 1,
    wherein the at least one ski is coated.

21. The array burial vehicle of claim 1, further comprising:
    a third nozzle disposed between the second nozzle and the front face of the plow blade and configured to spray a third jet of water onto the sea floor in the intended path of the array burial vehicle.

22. The array burial vehicle of claim 21, wherein a water flow rate through the third nozzle is 15 gallons per minute or less.

23. The array burial vehicle of claim 1, further comprising:
a heading sensor;
a depth sensor;
one or more load cells; and
a processor connected to the heading sensor, the depth sensor, and one or more load cells, wherein the processor is configured with processor-executable instructions to perform operations comprising:
receiving an array orientation input;
receiving a burial depth input;
receiving a sea floor reaction force input;
receiving heading data from the heading sensor;
receiving depth data from the depth sensor;
receiving reaction force data from the one or more load cells;
controlling the operation of the pump based on the depth data to bury the cable array at a depth corresponding to the burial depth input;
controlling operation of the inflatable ballast based on the reaction force data to maintain a reaction force corresponding to the sea floor reaction force input; and
controlling the operation of the at least one thruster based on the heading data to propel the array burial vehicle in a direction corresponding to a heading corresponding to the array orientation input.

24. The array burial vehicle of claim 23, wherein the at least one thruster is an articulated thruster, the array burial vehicle further comprising:
a gear box coupled to the articulated thruster and configured to change an orientation of the articulated thruster;
a gear box motor connected to the battery and coupled to the gear box, the gear box motor configured to drive the gear box; and
a side thruster connected to the battery.

25. A method for burying a cable array in sea floor sediment, comprising:
spraying a first jet of water and a second jet of water from an array burial vehicle into an intended path of the array burial vehicle to liquidize the sea floor sediment, wherein the array burial vehicle comprises:
a cable burial mechanism, comprising:
a plow blade;
a first nozzle disposed in front of a front face of the plow blade and configured to spray the first jet of water onto the sea floor in the intended path of the array burial vehicle; and
a second nozzle disposed between the first nozzle and the front face of the plow blade and configured to spray the second jet of water onto the sea floor in the intended path of the array burial vehicle;
a pump connected to the first nozzle and the second nozzle, and configured to provide water to the first nozzle and the second nozzle;
a cable pack configured to hold the cable array;
at least one ski configured to ride along the sea floor;
at least one thruster configured to propel the array burial vehicle along the sea floor;
a battery connected to the at least one thruster and configured to provide power to the electric pump motor and the at least one thruster;
an electric pump motor connected to the battery and the pump, the electric pump motor configured to drive the pump;
a high pressure air tank; and
an inflatable ballast connected to the high pressure air tank and configured to provide buoyancy for the array burial vehicle when inflated with air from the high pressure air tank;
passing the plow through the liquidized sea floor sediment along the intended path of the array burial vehicle to create a trench; and
depositing the cable array in the trench via the plow.

26. The method of claim 25, wherein:
spraying a first jet of water and a second jet of water from an array burial vehicle into an intended path of the array burial vehicle to liquidize the sea floor sediment comprises spraying a first jet of water and a second jet of water from an array burial vehicle at an angle toward the plow and into an intended path of the array burial vehicle to liquidize the sea floor sediment, and
depositing the cable array in the trench via the plow comprises depositing the cable array in the trench via the plow from a point on the plow at or before a hydraulic jump generated as a current of the first jet of water and the second jet of water slows down.

27. The method of claim 26, wherein the angle is 15 degrees.

* * * * *